(12) United States Patent
Mazumder et al.

(10) Patent No.: US 11,245,437 B2
(45) Date of Patent: Feb. 8, 2022

(54) SYSTEMS AND METHODS FOR CO-TRANSMISSION OF DISCRETE POWER AND DATA

(71) Applicant: THE BOARD OF TRUSTEES OF THE UNIVERSITY OF ILLINOIS, Urbana, IL (US)

(72) Inventors: Sudip K. Mazumder, Chicago, IL (US); Ankit Gupta, Chicago, IL (US)

(73) Assignee: UNIVERSITY OF ILLINOIS CHICAGO, Chicago, IL (US)

( * ) Notice: Subject to any disclaimer, the term of this patent is extended or adjusted under 35 U.S.C. 154(b) by 0 days.

(21) Appl. No.: 16/247,505

(22) Filed: Jan. 14, 2019

(65) Prior Publication Data

US 2019/0222259 A1 Jul. 18, 2019

Related U.S. Application Data

(60) Provisional application No. 62/616,501, filed on Jan. 12, 2018.

(51) Int. Cl.
| | | |
|---|---|---|
| *H04B 3/54* | (2006.01) | |
| *H04L 25/49* | (2006.01) | |
| *H02M 3/335* | (2006.01) | |

(52) U.S. Cl.
CPC ......... *H04B 3/542* (2013.01); *H04L 25/4902* (2013.01); *H02M 3/33507* (2013.01); *H04B 3/548* (2013.01)

(58) Field of Classification Search
CPC ..... H04B 3/542; H04B 3/548; H04L 25/4902; H02M 3/33507
See application file for complete search history.

(56) References Cited

U.S. PATENT DOCUMENTS

| 5,828,293 A | 10/1998 | Rickard |
| 6,452,482 B1 | 9/2002 | Cern |
| (Continued) | | |

OTHER PUBLICATIONS

J. Wu, S. Zong and X. He, "Power/signal time division multiplexing technique based on power electronic circuits," 2011 Twenty-Sixth Annual IEEE Applied Power Electronics Conference and Exposition (APEC), 2011, pp. 1710-1714, doi: 10.1109/APEC.2011.5744826. (Year: 2011).*

(Continued)

*Primary Examiner* — Sam K Ahn
*Assistant Examiner* — Amneet Singh
(74) *Attorney, Agent, or Firm* — Marshall, Gerstein & Borun LLP

(57) ABSTRACT

A system for co-transmitting discrete power and data over a common high frequency channel includes a power transmitting node, a power receiving node, a data transmitting node, a data receiving node, a power transmitting switch, a power receiving switch, a data transmitting switch, a data receiving switch, a primary power switch, a secondary power switch, a common high frequency channel, a first control unit, and a second control unit. When the primary power switch, power transmitting switch, and power receiving switch are in an activated state, a power signal is transmitted over the common high frequency channel from the power transmitting node to the power receiving node. When the secondary power switch, data transmitting switch, and data receiving switch are in an activated state, a data signal is transmitted over the common high frequency channel from the data transmitting node to the data receiving node.

11 Claims, 11 Drawing Sheets

(56) References Cited

U.S. PATENT DOCUMENTS

| | | |
|---|---|---|
| 7,986,711 B2 | 7/2011 | Horvath et al. |
| 2010/0074304 A1 | 3/2010 | Flammer, III |
| 2013/0233964 A1 | 9/2013 | Woodworth et al. |
| 2013/0260676 A1* | 10/2013 | Singh .................. H04B 5/0068 455/41.1 |

OTHER PUBLICATIONS

"Electric Drive Systems Research and Development | Department of Energy." [Online]. Available: https://energy.gov/eere/vehicles/vehicle-technologies-office-electric-drive-systems. [Accessed: Feb. 7, 2018].

Acharya et al., "Communication Fault-tolerant Wireless Network Control of a Load-sharing Multiphase Interactive Power Network," in 37th IEEE Power Electronics Specialists Conference, 2006, pp. 1-8.

Akyol et al., "PNNL-19084 A Survey of Wireless Communications for the Electric Power System," Pacific Northwest Natioanl Laboratory 2010.

Alan, "Effects of Parasitic Inductances on Switching Performance," in PCIM Europe, 2003, pp. 251-255.

Bose et al., "High frequency AC vs. DC distribution system for next generation hybrid electric vehicle," in Proceedings of the 1996 IEEE IECON. 22nd International Conference on Industrial Electronics, Control, and Instrumentation, 1996, vol. 2, pp. 706-712.

Chen et al., "A new approach to motor condition monitoring in induction motor drives," IEEE Transactions on Industry Applications, vol. 30, No. 4, pp. 905-911, 1994.

Coakley et al., "Real-time control of a servosystem using the inverter-fed power lines to communicate sensor feedback," IEEE Transactions on Industrial Electronics, vol. 46, No. 2, pp. 360-369, Apr. 1999.

Correa et al., "A single phase high frequency AC microgrid with an unified power quality conditioner," in 38th IAS Annual Meeting on Conference Record of the Industry Applications Conference, 2003., 2003, vol. 2, pp. 956-962.

Ferreira et al., "Power line communications: an overview," in Proceedings of IEEE. AFRICON '96, vol. 2, pp. 558-563.

Ferreira et al., Power line communications?: theory and applications for narrowband and broadband communications over power lines. John Wiley & Sons, 2011.

GaN Systems, "Bottom-side cooled 650 V E-mode GaN transistor," [Rev. 170321], 2017.

GaN Systems, "PCB Thermal Design Guide for GaN Enhancement Mode Power Transistors." [Online]. Available: http://www.gansystems.com/_uploads/whitepapers/. [Accessed: Feb. 3, 2018].

Ginot et al., "Application of Power Line Communication for Data Transmission Over PWM Network," IEEE Transactions on Smart Grid, vol. 1, No. 2, pp. 178-185, Sep. 2010.

Gupta et al., "Sequential Co-Transmission of High-Frequency Power and Data Signals," IEEE Transactions on Industrial Informatics, vol. 14 (10):4440-4445, 2018.

Gupta et al., "Frequency-dependent criterion for mitigation of transmission-line effects in a high-frequency distributed power systems," in 2015 IEEE Energy Conversion Congress and Exposition, ECCE 2015, 2015, pp. 4624-4631.

Gupta et al., "GaN solar microinverter with only 4 low side devices," in 2016 IEEE 4th Workshop on Wide Bandgap Power Devices and Applications (WIPDA), 2016, pp. 42-46.

Gupta et al., "GaN-FET based grid-connected solar microinverter: Some design insights," in 2017 IEEE 5th Workshop on Wide Bandgap Power Devices and Applications (WiPDA), 2017, pp. 233-237.

Huang et al., "Simultaneous Wireless Power/Data Transfer for Electric Vehicle Charging," IEEE Transactions on Industrial Electronics, vol. 64, No. 1, pp. 682-690, Jan. 2017.

Jain et al., "A Review of High-Frequency Power Distribution Systems: For Space, Telecommunication, and Computer Applications," IEEE Transactions on Power Electronics, vol. 29, No. 8, pp. 3852-3863, Aug. 2014.

Konate et al., "Power Line Communication in Motor Cables of Inverter-Fed Electric Drives," IEEE Transactions on Power Delivery, vol. 25, No. 1, pp. 125-131, Jan. 2010.

Kulkarni et al., "Resolving Practical Design Issues in a Single-Phase Grid-Connected GaN-FET Based Differential-Mode Inverter," IEEE Transactions on Power Electronics, vol. 33, No. 5, pp. 3734-3751, 2017.

Lee et al., "HomePlug 1.0 Powerline Communication LANs—Protocol Description and Performance Results version 5.4," Int. J. Commun. Syst., vol. 1, No. 1, pp. 1-6, 2002.

Lenzen et al., "Clock Synchronization: Open Problems in Theory and Practice," in SOFSEM 2010: Theory and Practice of Computer Science, J. van Leeuwen, A. Muscholl, D. Peleg, J. Pokorný, and B. Rumpe, Eds. Berlin, Heidelberg: Springer, Berlin, Heidelberg, 2010, pp. 61-70.

Liang et al., "Stability Enhancement of Decentralized Inverter Control Through Wireless Communications in Microgrids," IEEE Transactions on Smart Grid, vol. 4, No. 1, pp. 321-331, Mar. 2013.

Liu et al., "Potential benefits of distributed generators to power systems," in 2011 4th International Conference on Electric Utility Deregulation and Restructuring and Power Technologies (DRPT), 2011, pp. 1417-1423.

Luk et al., "High Frequency AC Power Distribution Platforms," in Power Electronics in Smart Electrical Energy Networks, London: Springer London, 2008, pp. 175-201.

Luo et al., "A review of distributed power systems. Part II. High frequency AC distributed power systems," IEEE Aerospace and Electronic Systems Magazine, vol. 21, No. 6, pp. 5-14, Jun. 2006.

Mahmood et al., "A review of wireless communications for smart grid," Renewable and Sustainable Energy Reviews, vol. 41, pp. 248-260, Jan. 2015.

Mammano, "Distributed Power Systems," Unitrode Power Supply Des. Semin., pp. 1-11, 1993.

Mannah et al., "A PLC-Based Method for Data Transmission Over a Pulsewidth-Modulated Network," IEEE Transactions on Power Delivery, vol. 26, No. 4, pp. 2259-2266, Oct. 2011.

Mannah et al., "Communication over a pulse width modulated network: Impact of the power cable," in IECON 2013—39th Annual Conference of the IEEE Industrial Electronics Society, 2013, pp. 3376-3381.

Mannah et al., "Effect of the power cable on data transmission over a pulsewidth-modulated network," IEEE Transactions on Industrial Electronics, vol. 61, No. 8, pp. 4238-4245, Aug. 2014.

Mazumder et al., "Master-Slave Current-Sharing Control of a Parallel DC-DC Converter System Over an RF Communication Interface," IEEE Transactions on Industrial Electronics, vol. 55, No. 1, pp. 59-66, Jan. 2008.

Mazumder et al., "Wireless PWM Control of a Parallel DC-DC Buck Converter," IEEE Transactions on Power Electronics, vol. 20, No. 6, pp. 1280-1286, 2005.

Reusch et al., "Understanding the Effect of PCB Layout on Circuit Performance in a High-Frequency Gallium-Nitride-Based Point of Load Converter," IEEE Transactions on Power Electronics, vol. 29, No. 4, pp. 2008-2015, Apr. 2014.

Sampath et al., "Synchronization in Distributed Systems," in Advances in Computing and Information Technology, N. Meghanathan, D. Nagamalai, and N. Chaki, Eds. Berlin, Heidelberg: Springer Berlin Heidelberg, 2012, pp. 417-424.

Shannon, "A Mathematical Theory of Communication," Bell Syst. Tech. J., vol. 27, No. 3, pp. 379-423, Jul. 1948.

Sood et al., "Power conversion distribution system using a high-frequency AC link," IEEE Transactions on Industry Applications, vol. 24, No. 2, pp. 288-300, 1988.

Stewart et al., "Guidelines for developing power stage layouts using normally-off SiC JFETs based on parasitic analysis," in 2013 IEEE Energy Conversion Congress and Exposition, 2013, pp. 948-955.

Tabisz et al., "Present and future of distributed power systems," in [Proceedings] APEC '92 Seventh Annual Applied Power Electronics Conference and Exposition, pp. 11-18.

(56) References Cited

OTHER PUBLICATIONS

Tahir et al., "Self-triggered Communication Enabled Control of Distributed Generation in Microgrids," IEEE Transactions on Industrial Informatics, vol. 11, No. 2, pp. 441-449, 2015.

Teulings et al., "MOSFET switching behaviour under influence of PCB stray inductance," in IAS '96. Conference Record of the 1996 IEEE Industry Applications Conference Thirty-First IAS Annual Meeting, vol. 3, pp. 1449-1453.

Wang et al., "A survey on the communication architectures in smart grid," Computer Networks, vol. 55, No. 15, pp. 3604-3629, Oct. 2011.

Wang et al., "Characterization and Experimental Assessment of the Effects of Parasitic Elements on the MOSFET Switching Performance," IEEE Transactions on Power Electronics, vol. 28, No. 1, pp. 573-590, Jan. 2013.

Wu et al., "Wireless Power and Data Transfer via a Common Inductive Link Using Frequency Division Multiplexing," IEEE Transactions on Industrial Electronics, vol. 62, No. 12, pp. 7810-7820, Dec. 2015.

Yang et al., "Effect and utilization of common source inductance in synchronous rectification," in Twentieth Annual IEEE Applied Power Electronics Conference and Exposition, 2005. APEC 2005., vol. 3, pp. 1407-1411.

\* cited by examiner

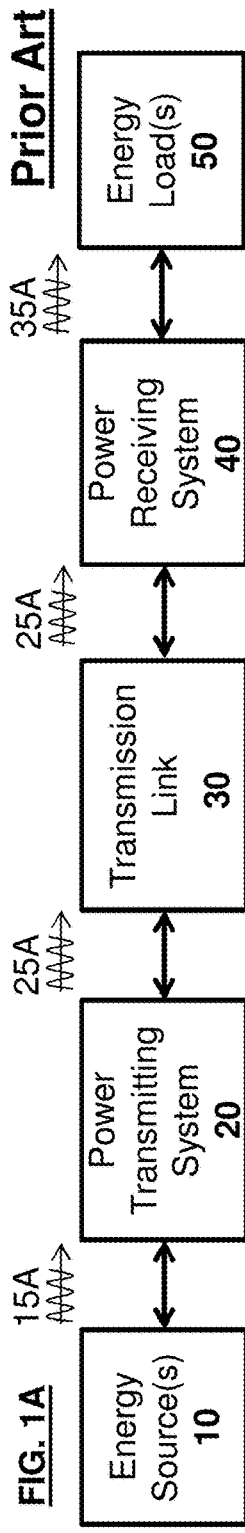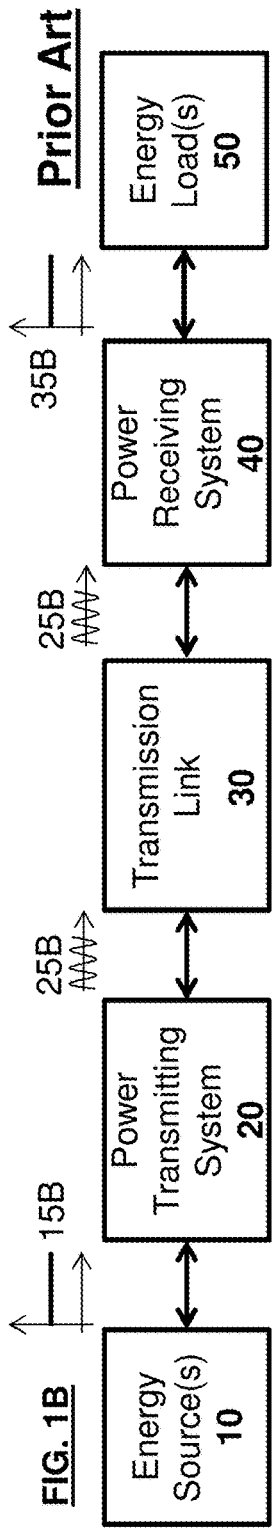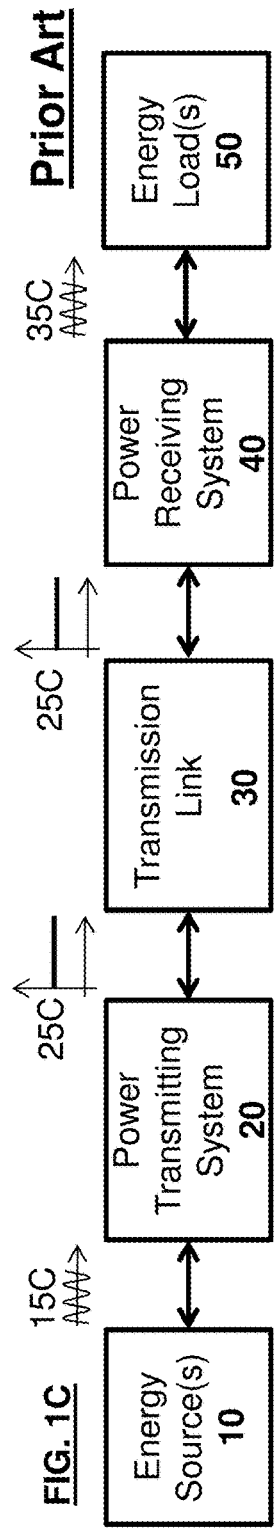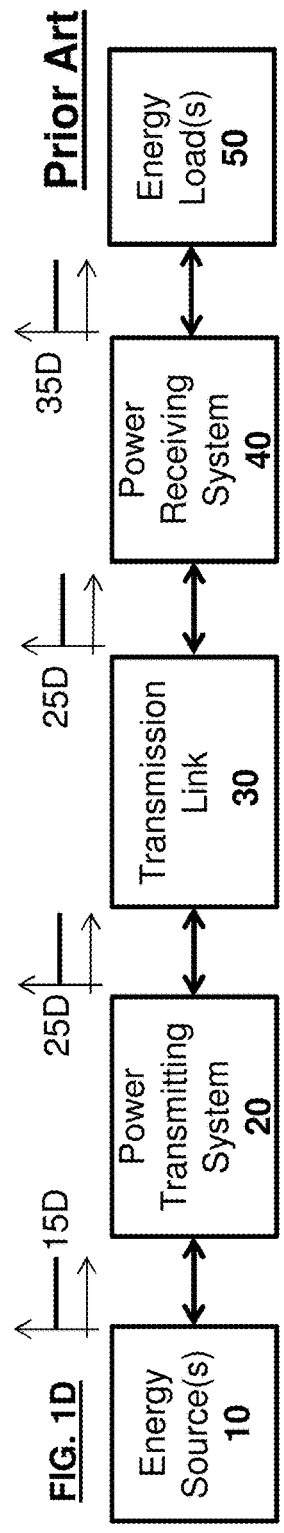

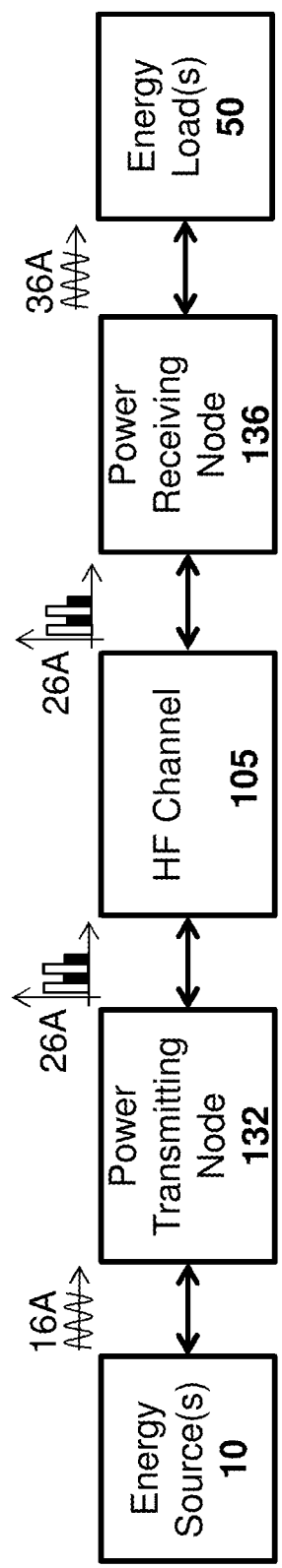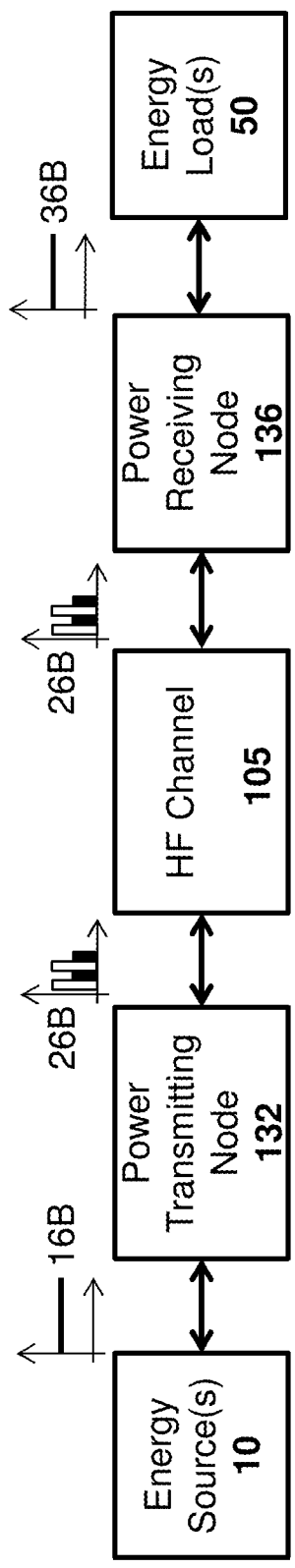

SYSTEMS AND METHODS FOR CO-TRANSMISSION OF DISCRETE POWER AND DATA

FIELD OF DISCLOSURE

The present disclosure generally relates to an electrical power and data system. More specifically, the disclosure relates to systems and methods for co-transmitting power and data signals over a common channel.

BACKGROUND OF THE INVENTION

Distributed power systems have become increasingly popular because of their scalability, ability to operate without being connected to the power grid, and ability to integrate with communication networks to exchange information. However, as the use, size, and complexity of distributed power systems increases, a need to more effectively allocate resources and deliver power has developed. FIGS. 1A and 1B depict a conventional low-frequency AC power electronics enabled distributed power system. FIGS. 1C and 1D depict a conventional DC power electronics enabled distributed power system. A typical power energy system includes one or more energy source(s) 10, a power transmitting system 20, a transmission link 30, a power receiving system 40, and one or more energy consuming load(s) 50. In such conventional systems, only continuous AC power signals (15A, 15C, 25A, 25B, 35A, and 35C) or continuous DC power signals (15B, 15D, 25C, 25D, 35B, and 35D) are transmitted through components of the system. FIG. 1A depicts a continuous AC power signal transmission in which a power transmitting network 20 transmits an AC power signal 25A, received as an AC power signal 15A from one or more energy source(s) 10), over a transmission link 30 to a power receiving network 40, and the energy load(s) receives AC power signal 35D. FIG. 1D depicts a continuous DC power signal transmission in which a power transmitting network 20 transmits a DC power signal 25D, received as a DC power signal 15D from one or more energy source(s) 10), over a transmission link 30 to a power receiving network 40, and the energy load(s) receives DC power signal 35D.

Typical distributed power systems primarily exchange continuous power signals of sinusoidal or pulse shape. Additionally, in conventional power systems, power signals can only be transformed from and/or transmitted as one type of continuous signal to another type of continuous signal, such as (1) AC to DC, (2) DC to AC, (3) AC to AC, or (4) DC to DC. Accordingly, this limits the quantity, size, and/or type of energy sources and/or loads that can be integrated with conventional power systems. An example of an AC to DC transformation is depicted in FIG. 1B with AC power signal 25B transformed to DC power signal 35B after transmission, and in FIG. 1C with AC signal power 15C transformed to DC power signal 25C before transmission. An example of a DC to AC transformation is depicted in FIG. 1B with DC power signal 15B transformed to AC power signal 25B for transmission, and in FIG. 1C with DC power signal 25C transformed to AC power signal 35C after transmission. An example of an AC to AC transmission is depicted in FIG. 1A with AC power signal 15A transformed to AC power signal 25A for transmission, and AC power signal 25A transformed to AC power signal 35A after transmission. An example of an DC to DC transmission is depicted in FIG. 1D with DC power signal 15D transformed to DC power signal 25D for transmission, and DC power signal 25D transformed to DC power signal 35D after transmission.

Conventionally, power signals and data signals are exchanged using separate infrastructure systems. While power-line communication (PLC) can be adapted to include a communication link for information exchange, such communication is typically only used for limited applications such as smart metering and monitoring of the power system. Typical power-line communication (PLC) systems that integrate data with low-frequency AC power signals are slow and unreliable at higher frequencies of power transmission. Existing power and data signal co-transmission techniques consist of superimposing high frequency (HF) data signals over 60/50-Hz low-frequency (LF) power signals, and simultaneously transmitting the two different types of signals. Additionally, existing power and data signals are heavily reliant on synchronization between the various components. FIG. 3A depicts a graph of a conventional system of simultaneous co-transmission of power and data signals in which a high frequency data transmission (HFDT) is simultaneously transmitted with a low frequency power transmission (LFPT). However, because of the wide separation in frequency between the two signals (HF data and LF power), extracting the separate power and data signals requires additional equipment and procedures. For example, PLC systems require large reactive couplers, line traps, and low-order analog-filtering circuits to couple and extract data transmitted over the power line. In turn, this increases the transmission losses associated with both power and data. Further, the addition of the hardware necessary to handle the data largely eliminates any economic benefits achieved through the savings of overhead costs achieved by using existing infrastructure.

Additionally, simultaneous transmission using a PLC produces temporal overlap between the power and data signals, and background noise is generated by the average current flowing through the network. As a result of this, the channel capacity for data transmission is reduced, thereby increasing the probability for loss/failure of the data transmission. Further, existing PLC power and data transmission systems are synchronous, which in turn leads to inefficiencies. Overall, existing co-transmission techniques provide an imperfect solution to transmitting power and data over a common channel.

SUMMARY OF THE INVENTION

The systems and methods described herein relate to co-transmission of power and data signals over common channel.

In general, the present disclosure relates to utilizing a mutually exclusive switching technique to transmit power and data signals over a common high frequency channel in a manner that reduces losses and guards against data corruption. The transmitted data signals may include information that controls, or relates to the control, of the power system components.

In one embodiment, a system comprises a power transmitting node a power receiving node, a data transmitting node, a data receiving node, and a switching module. The switching module may include a common high frequency channel configured to transmit one or more power signals and one or more data signals, a power transmitting switch, a power receiving switch; a data transmitting switch, and a data receiving switch. When the power transmitting switch and the power receiving switch are both turned on and the data transmitting switch and the data receiving switch are both turned off, the one or more power signals are transmitted over the common high frequency channel from the power transmitting node to the power receiving node. When the data transmitting switch and the data receiving switch are both turned on and the power transmitting switch and the power receiving switch are both turned off, the one or more data signals is transmitted over the common high frequency channel from the data transmitting node to the data receiving node.

In another embodiment, a method for transmitting power and data comprises transmitting a power packet and a data packet over common high frequency channel of a switching module. The method transmits the power packet from a power transmitting node to a power receiving node when a power transmitting switch and a power receiving switch are both in an active state while a data transmitting switch and a data receiving switch are both in a non-active state, and transmits the data packet, via the common high frequency channel of the switching module, from a data transmitting node to a data receiving node when the data transmitting switch and the data receiving switch are both in an active state while the power transmitting switch and the power receiving switch are both in a non-active state.

In another embodiment, a system comprises one or more energy sources configured to supply one or more power signals in a first waveform, one or more power transmitting nodes configured to code the one or more power signals in the first waveform into one or more discrete power packets, one or more power receiving nodes configured to decode the one or more discrete power packets, one or more energy loads configured to receive at least a segment of the one or more power signals in the first waveform based on the one or more discrete power packets received by the one or more power receiving nodes, and a common high frequency channel configured to transmit the one or more discrete power packets from the one or more power transmitting nodes to the one or more power receiving nodes.

In another embodiment, a system comprises one or more energy sources, one or more energy loads, one or more power transmitting nodes, one or more power receiving nodes, and a common high frequency channel. The one or more energy sources are configured to supply one or more unipolar and/or bipolar discrete, Boolean, continuous AC, and/or time-invariant DC power signals of a first arbitrary wave shape and/or sequencing in a first waveform. The one or more power transmitting nodes are configured to code the one or more power signals in the first waveform into one or more unipolar and/or bipolar discrete and/or Boolean power packets of a second arbitrary wave shape and/or sequencing, and the one or more power receiving nodes are configured to decode the one or more unipolar and/or bipolar discrete and/or Boolean power packets of the second arbitrary wave shape and/or sequencing. The one or more energy loads are configured to receive at least a segment of the one or more power signals in the first waveform based on the one or more unipolar and/or bipolar discrete and/or Boolean power packets of the second arbitrary wave shape and/or sequencing received by the one or more power receiving nodes. The common high frequency channel may be a time-varying and/or time-invariant waveguided and/or free-space high frequency channel with one or more transmission pathways of arbitrary configuration, configured to sequentially or simultaneously transmit one or more data signals with the one or more unipolar and/or bipolar discrete and/or Boolean power packets of the second arbitrary wave shape and/or sequencing. The one or more data signals may be superimposed between power packets and the one or more data signals are transmitted from one or more power transmitting nodes to one or more power receiving nodes. The system utilizes one or more mechanisms for preventing unwanted overlap between the one or more power signals and the one or more data signals and/or networks.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and descriptions are to be regarded as illustrative in nature and not as restrictive.

BRIEF DESCRIPTION OF THE DRAWINGS

The features and advantages of the systems and methods described herein will be best appreciated upon reference to the following detailed description and the accompanying drawings, in which:

FIG. 1A depicts a prior art AC power electronics enabled distributed power system.

FIG. 1B depicts a prior art DC power electronics enabled distributed power system.

FIG. 1C depicts another prior art DC power electronics enabled distributed power system.

FIG. 1D depicts yet another prior art DC power electronics enabled distributed power system.

FIG. 2A depicts a high-frequency distributed power system with an energy source generating a bipolar output.

FIG. 2B depicts a high-frequency distributed power system with an energy source generating a unipolar output.

DETAILED DESCRIPTION OF THE INVENTION

Figure 3A:
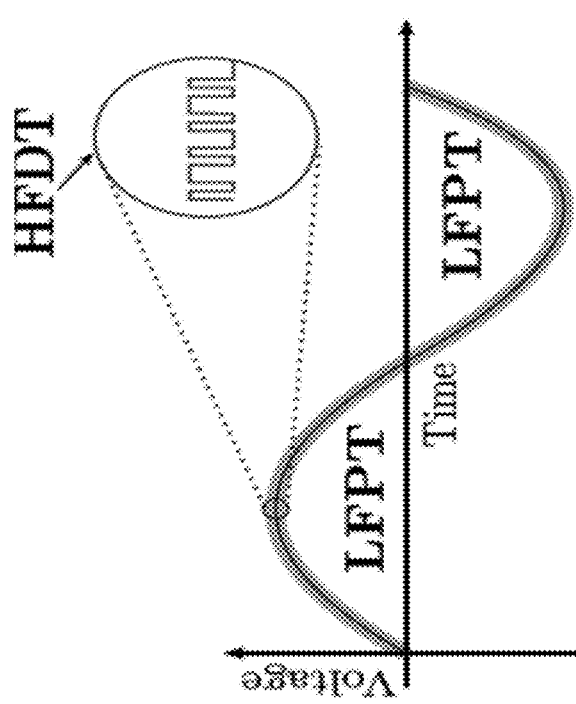
FIG. 3A depicts a graph of a prior art system for simultaneous co-transmission of power and data signals.

The present disclosure relates to systems and methods for co-transmitting high frequency (HF) discrete and/or Boolean power and discrete and/or Boolean data signals over a common HF channel. The sequential or simultaneous co-transmission techniques described herein offer a benefit over existing transmission of power-line communication (PLC) by temporally distributing power and data signals over a common HF channel. Separately transmitting power and data signals prevents overlap between the power and data signals, and thus diminishes the likelihood of data corruption. Further, eliminating spectral overlap between power signals and data signals minimizes security threats and improves the reachability of each signal. The systems and methods provide an alternative power distribution framework by transferring power in discretized energy packets, thereby asynchronously dispatching power based on demand. Further, enabling a distributed power system with high frequency power transfer increases system power density and dynamic response by decreasing the size of the system's magnetic and capacitive components. The systems and methods described herein improve efficacy and offer a more economical solution over PLC systems.

The discrete high frequency distributed power systems (HFDPS) described herein provide improved modularity, flexibility, scalability, resiliency, and reliability over conventional power systems. Unlike conventional power system, the HFDPS is configured to transmit energy in a variety of different forms using packetization and routing techniques. FIG. 2A depicts a high-frequency distributed power system with an energy source generating a bipolar output, and FIG. 2B depicts a high-frequency distributed power system with an energy source generating a unipolar output. In both bipolar and unipolar high-frequency distributed power systems, a power transmitting node 132 transmits coded power packets over a HF channel 105 to a power receiving node 136. In operation of the bipolar system of FIG. 2A, the energy source 10 supplies an AC power signal 16A to the power transmitting node 136. The power transmitting node 136 transforms the continuous, AC power signal 16A into a discrete, coded power signal 26A, and transmits the discrete, coded power signal 26A over the common HF channel 105 to the power receiving node 136. The power receiving node receives the discrete, coded power signal 26A, and transforms the power signal 26A back into an AC power signal 36A for the energy load 50.

Similarly, in operation of the unipolar system of FIG. 2B, the energy source 10 supplies a DC power signal 16B to the power transmitting node 136. The power transmitting node 136 transforms the continuous, DC power signal 16D into a discrete, coded power signal 26D, and transmits the discrete, coded power signal 26D over the common HF channel 105 to the power receiving node 136. The power receiving node receives the discrete, coded power signal 26D, and transforms the power signal 26D back into a DC power signal 36A for the energy load 50.

By enabling coding and transforming of the power signal(s) and power packet(s), overall power transfer loss may be reduced, power quality of waveforms may be improved, complexity and cost of the power electronics involved in the switching may be reduced, and overall reliability may be enhanced. It should be appreciated that in some embodiments, the power and/or data transfer may be continuously and/or simultaneously transferred.

Conventional power systems, such as those depicted in FIGS. 1A, 1B, 1C, and 1D, can only transmit continuous, bipolar signals (25A and 25C) and unipolar signals (25B and 25D). Further, conventional systems such as FIGS. 1B and 1C can only transform an AC signal (15B) to be transmitted as a DC signal (25B), or a DC signal (15D) to be transmitted as an AC signal (25C). However, the HFDPS, such as those depicted in FIGS. 2A and 2B, are configured to transform the wave shape and/or form of the power signal transmitted over the transmission channel. For example, the wave shape of a continuous, sinusoidal bipolar AC signal (16A) may be transformed and transmitted as a different shape and/or type of signal, such as a discontinuous, unipolar packetized signal (16B). Transforming the wave shape may improve transmission integrity and efficiency. The wave shape of the transmitted power signal may be unipolar, bipolar, sinusoidal, square, and/or any other type of shape. Further, this technique of discrete and/or Boolean power transfer enables routing of the power from one or more energy sources to one or more loads.

Figure 3B:
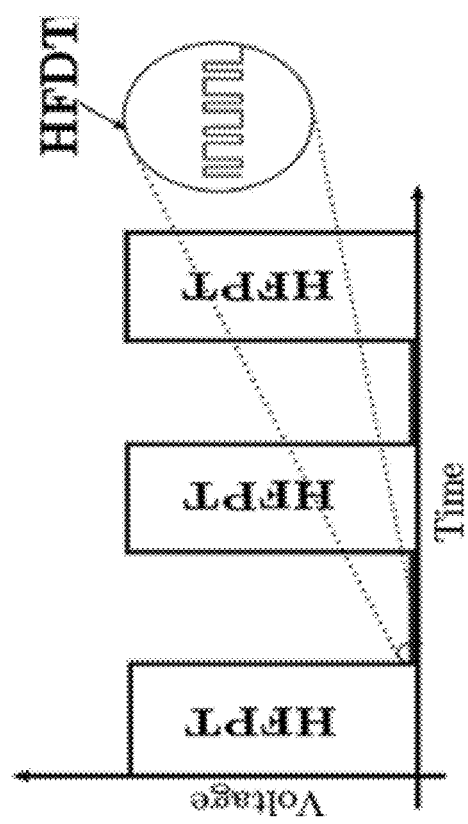
FIG. 3B depicts a graph of sequential co-transmission of power and data signals.

FIG. 3B depicts a graph of sequential co-transmission of power and data signals. As depicted, a high voltage, high frequency power transmission (HFPT) and a low voltage, high frequency data transmissions (HFDT) are transferred using discrete packets. Transmitting power and data signals using discrete and/or Boolean packets increases network utilization through the ability to cater to a greater number of loads, allows power transfer at higher speeds because less energy needs to be stored, and provides increased system efficiency by coding discrete power packets based on specific load requirements. Conventional distributed power systems, as depicted in FIG. 3A, continuously transmit power, which in turn can lead to losses and/or create network inefficiencies. Further, discrete HFDPS's, as depicted in FIG. 3B, can provide discontinuous power directed by network protocols that dynamically determine existing source availability and load demand. Discrete HFDPS may employ an energy management system to assign priority to each source and load, thereby optimizing network utilization by using a great number of loads and sources in a more proficient manner. Routing protocol and/or priority may be determined based on the occurrence of a specific event, a predetermined schedule, and/or other characteristic. For example, priority may be assigned based on the amount, the frequency, and/or the urgency of which the power is needed by one or more loads and/or can be supplied by one or more sources. Further, some embodiments of the discrete HFDPS described herein provide improved modularity and flexibility because they do not rely on synchronization between components, as is typically required of existing AC power systems. Ultimately, this reduces losses and improves efficiency.

This power delivery system may be implemented as a Boolean microgrid, and utilized with smart grids, vehicular microgrids, electric ships and submarines, military microgrids, electric aircrafts, telecommunication systems, multi-axis-drive, urban residential and commercial power networks, remote residential and commercial power networks, mission critical uninterruptable power systems (e.g., data centers, hospitals, emergency systems), and other power system applications.

Figure 4:
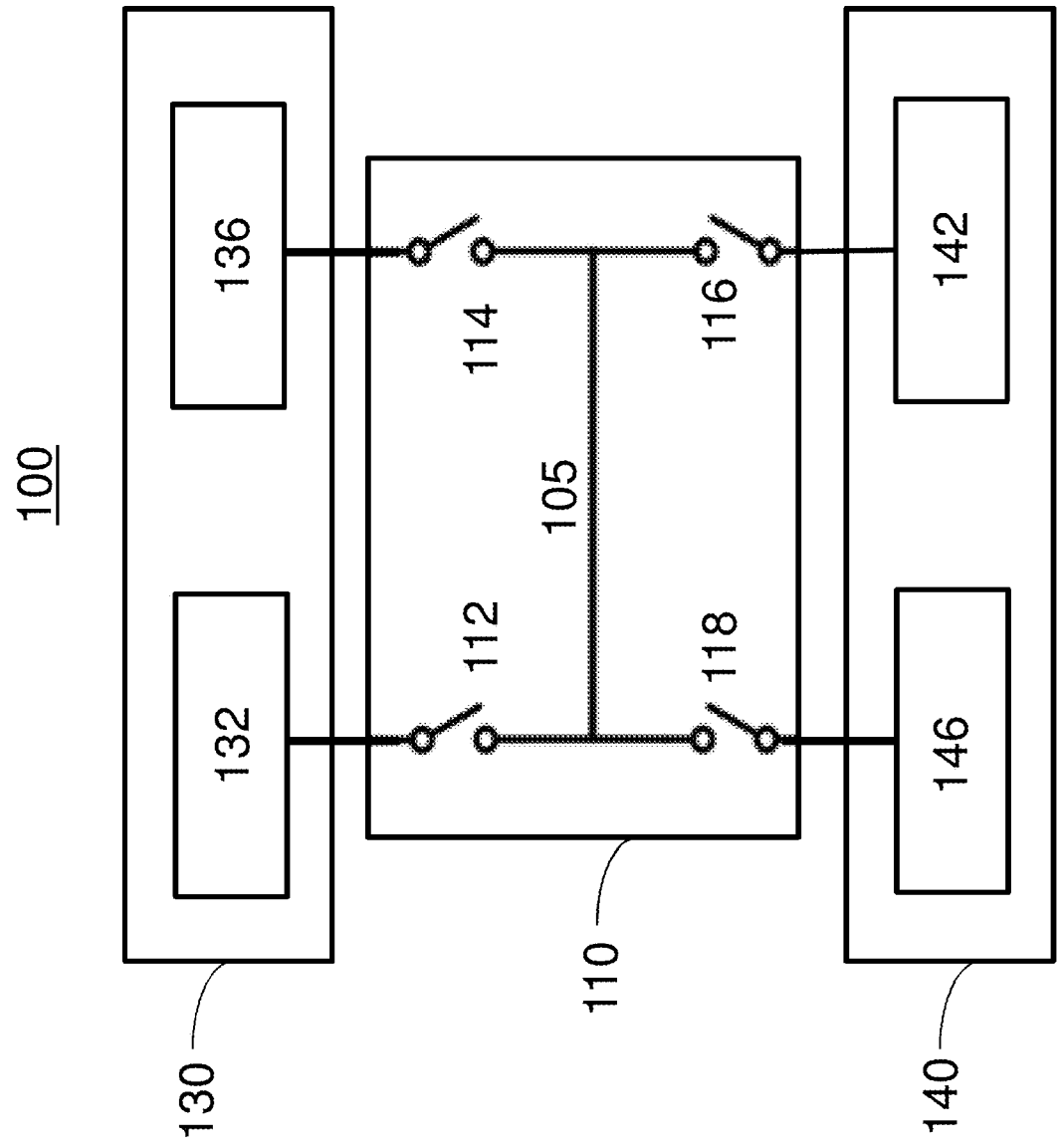
FIG. 4 depicts a generalized schematic of a system for co-transmission of power and data signals over a common high frequency channel.

FIG. 4 depicts a generalized schematic of a system 100 for co-transmission of power and data signals over a common high frequency channel. The system 100 includes a switching module 110, a power transmission network 130, and a data transmission network 140.

The switching module 110 is configured to facilitate sequential co-transmission of power and data signals over a common high frequency channel. The switching module 110 includes a common HF channel 105, a power transmitting switch 112 ("$S_{PT}$ 112"), a power receiving switch 114 ("$S_{PR}$ 114"), a data transmitting switch 116 ("$S_{DT}$ 116"), and a data receiving switch 118 ("$S_{DR}$ 118"). The switching module 110 may include thermal pads on the bottom side in order to facilitate/aid in the management of heat transfer created by the process of transferring power. The common HF channel 105 is configured to serve as a common medium for transmitting both power and data signals. In some embodiments the common HF channel 105 may be a high voltage or low voltage power line. In some embodiments, the common HF channel 105 may be a waveguided or free space channel/link. The power transmitting switch 112 is configured to connect and disconnect the power transmitting node 132 to the common HF channel 105. The power receiving switch 114 is configured to connect and disconnect a power receiving node 136 to the common HF channel 105. The data transmitting switch 116 is configured to connect and disconnect a data transmitting node 142 to the common HF channel 105. The data receiving switch 118 is configured to connect and disconnect a data receiving node 146 to the common HF channel 105. The power transmitting switch 112, the power receiving switch 114, the data transmitting switch 116, and the data receiving switch 118 operate using XOR and/or XNOR logic operators, such that $[(S_{PT}\ 112)\ \text{XNOR}\ (S_{PR}\ 114)]=1$, $[(S_{DT}\ 114)\ \text{XNOR}\ (S_{DR}\ 118)]=1$, $[(S_{PT}\ 112)\ \text{XOR}\ (S_{DT}\ 116)]=1$, and $[(S_{PR}\ 114)\ \text{XOR}\ (S_{DR}\ 118)]=1$. Implementing this logic ensures that the power transmitting switch 112 and the power receiving switch 114 are in a synchronized mode of operation with each other, and that the data transmitting switch 116 and the data receiving switch 118 are also in a synchronized mode of operation with each other. Implementing this logic also ensures that the power switches (the power transmitting switch 112 and the power receiving switch 114) and data switches (the data transmitting switch 116 and the data receiving switch 118) operate complementarily to one another. Thus, the power transmitting node 132 transmits power over HF channel 105 to the power receiving node 136 when both the power transmitting switch 112 and the power receiving switch 114 are active/switched on. Similarly, the data transmitting node 142 transmits data over HF channel 105 from the data transmitting node 142 to the data receiving node 146 when both the data transmitting switch 116 and the data receiving switch 118 are active/switched on. In some embodiments, the switching module 110, or one of its components, determines routing protocol for transmitting power and/or data from one or more transmitting nodes to one or more receiving nodes. While many embodiments and examples in the present disclosure include switching components as part of power and/or data transfer, it should be appreciated that in some embodiments no switching components are needed, and power and/or data are transmitted directly from a transmitting node over the common HF channel 105 to a receiving node.

The power transmission network 130 transmits electrical power signals over a high frequency channel in a fast and reliable manner between the power transmitting node 132 and the power receiving node 136. The power transmission network 130 may transmit discrete, Boolean, continuous AC, and/or time-invariant DC power of arbitrary wave shape and/or arbitrary sequence over a common frequency channel to yield time and/or event guided packetization of power transfer. The power transmission network 130 may asynchronously or synchronously transfer power. Additionally, the power network 130 may dynamically route power between a plurality of energy sources and energy loads. For example, the power transmission network 130 comprises peer-to-peer power delivery between one or more energy sources and one or more energy loads. The power transmitting node 132 contains or is coupled to a power generating source and is configured to transmit a power signal over the common HF channel 105, while the power receiving node 136 contains or is coupled to a load and is configured to receive a power signal over the common HF channel 105. The power transmitting node 132 and the power receiving node 132 may be easily controllable, able to integrate with the common HF channel 105, and configured to perform step-up and/or step-down operations. The power transmitting node 132, or one of its components, may determine how and/or to which power receiving node or energy load a power signal/packet is routed. In such embodiments, the power transmitting node 132 and power receiving node 136 may include and/or be directly coupled with data routing transmitting/receiving components. Such dynamic routing may be accomplished using energy source and/or energy load multiplexing. The power transmitting node 132 and the power receiving node 136 may operate as part of a mesh network. Specific embodiments and circuitry of the power transmitting node 132 and power receiving node 136 will be discussed with regard to FIG. 8. In some embodiments, one or more data packet/signals may be sequentially and/or simultaneously transmitted with a power packet/signal by superimposing the data packet/signal between one or more power packets/signals. In such embodiments, a mechanism may be employed to prevent unwanted overlap between the power and data signals and/or networks.

The data transmission network 140 exchanges electrical data signals/packets over a high frequency channel in a fast and reliable manner between the data transmitting node 142 and the data receiving node 146. The data transmission network 140 may transmit discrete and/or Boolean data of arbitrary wave shape and/or arbitrary sequence over a common frequency channel to yield time and/or event guided packetization of data transfer. The data transmission network 140 may implement advanced network control algorithms by exchanging status information, control commands, and/or sensor feedback between the components of the power transmission network 130 and the switching module 110. The data transmission network 140 includes the data transmitting node 142 and the data receiving node 146. The data transmitting node 142 is configured to transmit a data signal/packet over the common HF channel 105, while the data receiving node 146 is configured to receive a data signal/packet over the common HF channel 105. The data transmission network 140 may handle a high volume of real-time, bi-directional data transmissions between one or more power electronic systems connecting one or more distributed energy resources to one or more loads. The data transmission network 140 may provide intelligent management of power/energy resources associated with the power transmission network 130. It should be appreciated that in some embodiments data may be transmitted simultaneously with power over the common HF channel 105. The data transmitting node 142 and the data receiving node 146 may operate as part of a mesh network. In some embodiments, data may be transmitted with a power signal transmission.

A wide variety of power and data delivery applications may benefit from implementation of the system 100. For example, smart buildings, lightning systems, microgrids, nanogrids, manufacturing, urban infrastructure, and other applications requiring power and data exchange may implement the system 100 for intelligent power delivery. The system 100 may implement need-based power delivery and/or dynamic load management. Because the system 100 transfers power using discrete HF packets, the system 100 may connect a variety of sources with different voltage characteristics to a variety of loads using the common HF channel 105. In some embodiments, the data transmitted over the data network 140 corresponds to information regarding load power requirements and/or source power availability. Further, the system 100 may operate using high and/or low voltages. The system 100 may transmit discrete power packets and data packets sequentially, simultaneously, and/or intermittently. Accordingly, discrete power packets may be transmitted before, during, or after a data packet transmission, and vice-versa.

In some embodiments, the components of system 100 may be in close physical proximity to one another while, in others, the components of system 100 may be in separate, non-proximal locations. For example, the various components of the system 100 may each be in separate distinct physical locations miles apart from one another.

It should be appreciated that switching module 110 may include more than one set of power and data switches. For N-number of power transmitting and power receiving nodes, the switching module may include N-number of power transmitting switches and power receiving switches. Similarly, for N-number of data transmitting and data receiving nodes, the switching module may include N-number of data transmitting switches and data receiving switches. However, it should be appreciated that in some embodiments the switching module 110 may include a different number of power switch pairs than the number of data switch pairs.

While the system 100 may only depict and disclose a single-input single-output (SISO) network, it should be appreciated that the system and techniques described herein may also be implemented across a single-input multiple-output (SIMO), multiple-input single output (MISO) network, and/or a multiple-input and multiple-output (MIMO) network. Accordingly, the system may be utilized in local environments, such as individual residence and/or building, and/or an individual space within a residence or building. Whereas in some embodiments the system may be used in large, wide-area scales, such as a plurality of residences, buildings, and/or other loads. By way of example and not limitation, in an example SIMO network, a single generator, provides power over a common channel to the various loads of a restaurant, such as kitchen appliances, computers, air conditioning, lighting, and/or entertainment devices. In an example of a MISO network, multiple generators owned by a power supply company transmit power over a common channel in order to satisfy an emergency lighting system of a large hospital. In an example of a MIMO network, an energy management system may decide how to distribute power supplied by multiple power generators over a common channel to effectively satisfy the demands of multiple residences and businesses.

In such SIMO, MISO, and MIMO embodiments, protocol may be implemented to facilitate source scheduling and/or load scheduling based on demand and network size. Additionally, in embodiments of such SIMO, MISO, or MIMO networks, a single HF channel (e.g., the common HF channel 105) may be used to transmit power and data signals among the nodes. In other embodiments, a plurality of common HF channels may be used to transmit power and data signals among the different nodes.

Figure 5:
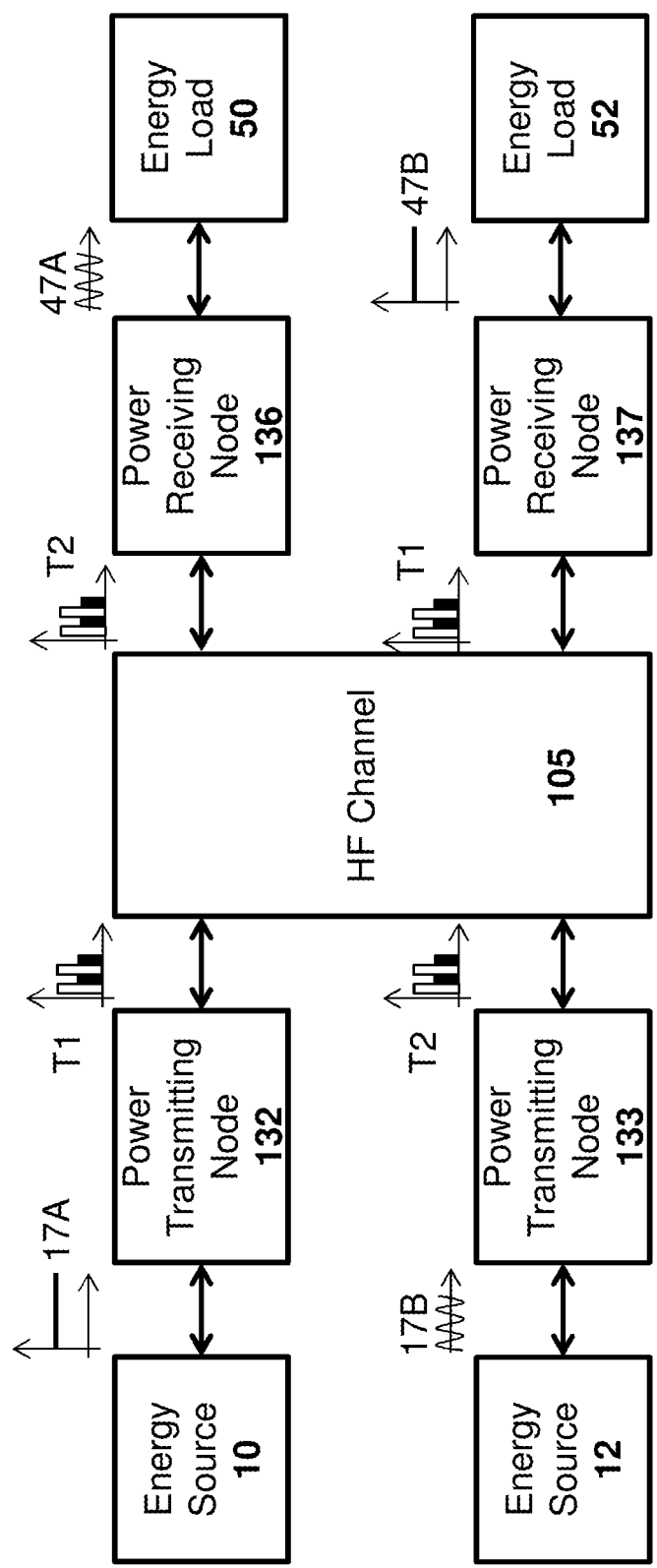
FIG. 5 depicts a diagram of an embodiment of a multi-source power packet transmission system with multiple outputs.

FIG. 5 depicts a diagram of an embodiment of a multi-source power packet transmission system with multiple outputs. This embodiment, which corresponds to a MIMO system, includes a first energy source 10, a second energy source 12, a first power transmitting node 132, a second power transmitting node 133, the common HF channel 105, a first power receiving node 136, a second power receiving node 137, a first energy load 50, and a second energy load 52. The first power transmitting node 132 and the second power transmitting node 133 may include the same or similar components and operate in the same or a similar manner as the power transmitting node 132 described in FIG. 4. The first power receiving node 136 and the second power receiving node 137 may include the same or similar components and operate in the same or a similar manner as the power receiving node 136 described in FIG. 4. The common HF channel 105 may operate in the same or similar manner as the common HF channel 105 of FIG. 4. In operation, the system may transform and route power packets from the first power transmitting node 132 and/or the second power transmitting node 133 to the first power receiving node 136 and/or the second power receiving node 137. In one embodiment, as depicted in FIG. 5, the system may transform a continuous DC power signal 17A into a discrete power packet T1 and route the discrete power packet T1 from the first power transmitting node 132 to the second power receiving node 137 over the common HF channel 105, and the second energy load 52 receives a continuous DC power signal 47B. Additionally, the system may transform a continuous AC power signal 17B into a discrete power packet T2 and route the discrete power packet T2 from the second power transmitting node 133 to the first power receiving node 136 over the common HF channel 105, and the first energy load 50 receives a continuous AC power signal 47A. In such embodiment, the power signal T1 and the power signal T2 may be transmitted over the common HF channel 105 simultaneously or sequentially.

Whereas in another embodiment in which the system routes power packets T1 and T2 differently, the system may transform a continuous DC power signal 17A into a discrete power packet T1 and route the discrete power packet T1 from power transmitting node 132 to power receiving node 136 over the common HF channel 105, and then the first energy load 50 receives a continuous DC power signal 47B. Accordingly, the system may transform a continuous AC power signal 17B into a discrete power packet T2 and the route discrete power packet T2 from the second power transmitting node 133 to the second power receiving node 137 over the common HF channel 105, and then the second energy load 52 receives a continuous AC power signal 47A at the second energy load 52. In such embodiment, the power signals T1 and the power signal T2 may be transmitted over the common HF channel 105 simultaneously or sequentially. In embodiments in which the discrete power packets T1 and T2 are transmitted sequentially, the order in which the discrete packets are transmitted and/or received may be of significance. For example, a load requiring power with more urgency may receive a power packet before another load. Whereas in other embodiments, the discrete packets may be transmitted and/or received in no particular order.

It should be appreciated that FIG. 5 is a non-limiting embodiment, and that the system may operate in varying iterations in which the first energy source 10 supplies an AC power signal or a DC power signal to be received by the first energy load 50 or the second energy load 52, the second energy source 12 supplies an AC power signal or a DC power signal to be received by the first energy load 50 or the second energy load 52, the first energy load 50 receives an AC power signal or a DC power signal transmitted by the first energy source 10 or the second energy source 12, and/or the second energy load 52 receives an AC power signal or a DC power signal transmitted by the first energy source 10 or the second energy source 12. It should also be appreciated that the techniques described with respect to FIG. 5 may be implemented in other embodiments featuring more than two energy sources, two power transmitting nodes, two power receiving nodes, and/or two energy loads.

Figure 6:
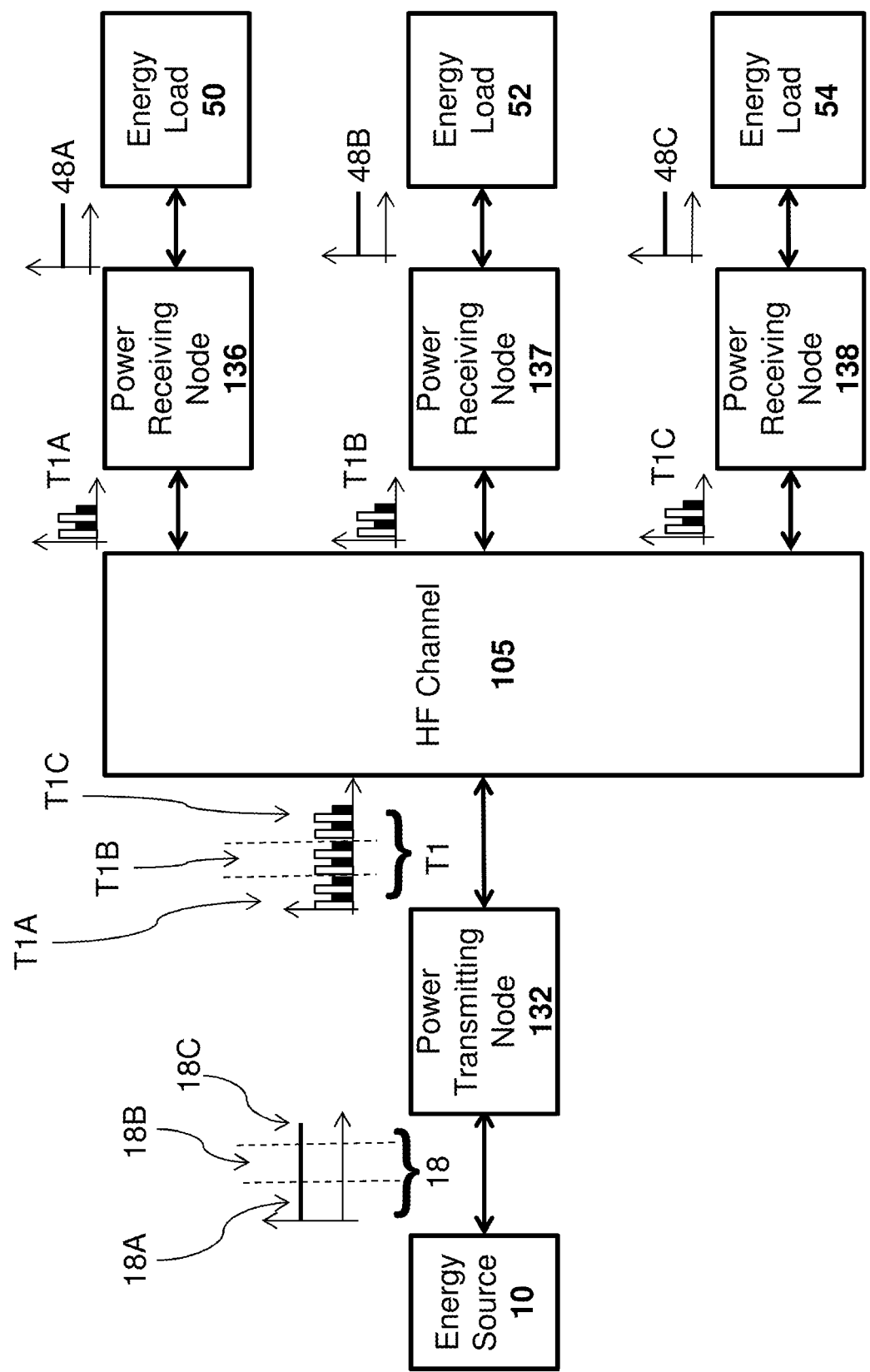
FIG. 6 depicts a diagram of an embodiment of a power packet transmission system with multiple loads.

FIG. 6 depicts a diagram of an embodiment of a power packet transmission system with multiple loads. This embodiment, which corresponds to a SIMO system, includes an energy source 10, a power transmitting node 132, the common HF channel 105, a first power receiving node 136, a second power receiving node 137, a third power receiving node 138, a first energy load 50, a second energy load 52, and a third energy load 54. The power transmitting node 132 may include the same or similar components and operate in the same or a similar manner as the power transmitting node 132 described in FIG. 4. The first power receiving node 136, the second power receiving node 137, and the third power receiving node 138 may include the same or similar components and operate in the same or a similar manner as the power receiving node 136 described in FIG. 4. The common HF channel 105 may operate in the same or similar manner as the common HF channel 105 of FIG. 4. In operation, the system may transform and route power packets from the power transmitting node 132 to the first power receiving node 136, the second power receiving node 137, and/or the third power receiving node 138 based on a time division multiple access (TDMA), an event driven sharing protocol, or any other high freqeuncy channel sharing protocol.

In one embodiment, as depicted in FIG. 6, the system may transform a continuous DC power signal 18, or a plurality of DC power signals (e.g., 18A, 18B, and 18C), into a discrete power packet T1, or multiple discrete power packets T1A, T1B, and T1C, and route the discrete power packets T1A, T1B, and/or T1C from the power transmitting node 132 to the first power receiving node 136, the second power receiving node 137, and/or the third power receiving node 138 over the common HF channel 105. In such an embodiment, a first segment 18A of the continuous DC power signal 18 may be transformed into the discrete power packet T1A, a second segment 18B of the continuous DC power signal 18 may be transformed into the discrete power packet T1B, and a third segment 18C of the continuous DC power signal 18 may be transformed into the discrete power packet T1C. The system may route the discrete power packet T1A to the first power receiving node 136, the discrete power packet T1B to the second power receiving node 137, and/or the discrete power packet T1C to the third power receiving node 137. Accordingly, the first energy load 50 may receive a continuous DC power signal 48A, the second energy load 52 may receive a continuous DC power signal 48B, and the third energy load 54 may receive a continuous DC power signal 48C. The received continuous DC power signals 48A, 48B, and 48C may correspond to the first segment 18A, the second segment 18B, and the third segment 18C, respectively, of the continuous DC power signal 18. It should be appreciated that the system may transmit different packets to different nodes. For example, the system may route the discrete power packet T1A to the second power receiving node 137 and route the discrete power packet T1B to the first power receiving node 136. The discrete power packets T1A, T1B, and T1C may be transmitted over the common HF channel 105 simultaneously or sequentially. In embodiments in which the discrete power packets T1A, T1B, and T1C are transmitted sequentially, the order in which the discrete packets are transmitted and/or received may be of significance. Whereas in other embodiments, the discrete packets may be transmitted and/or received in no particular order.

Figure 7:
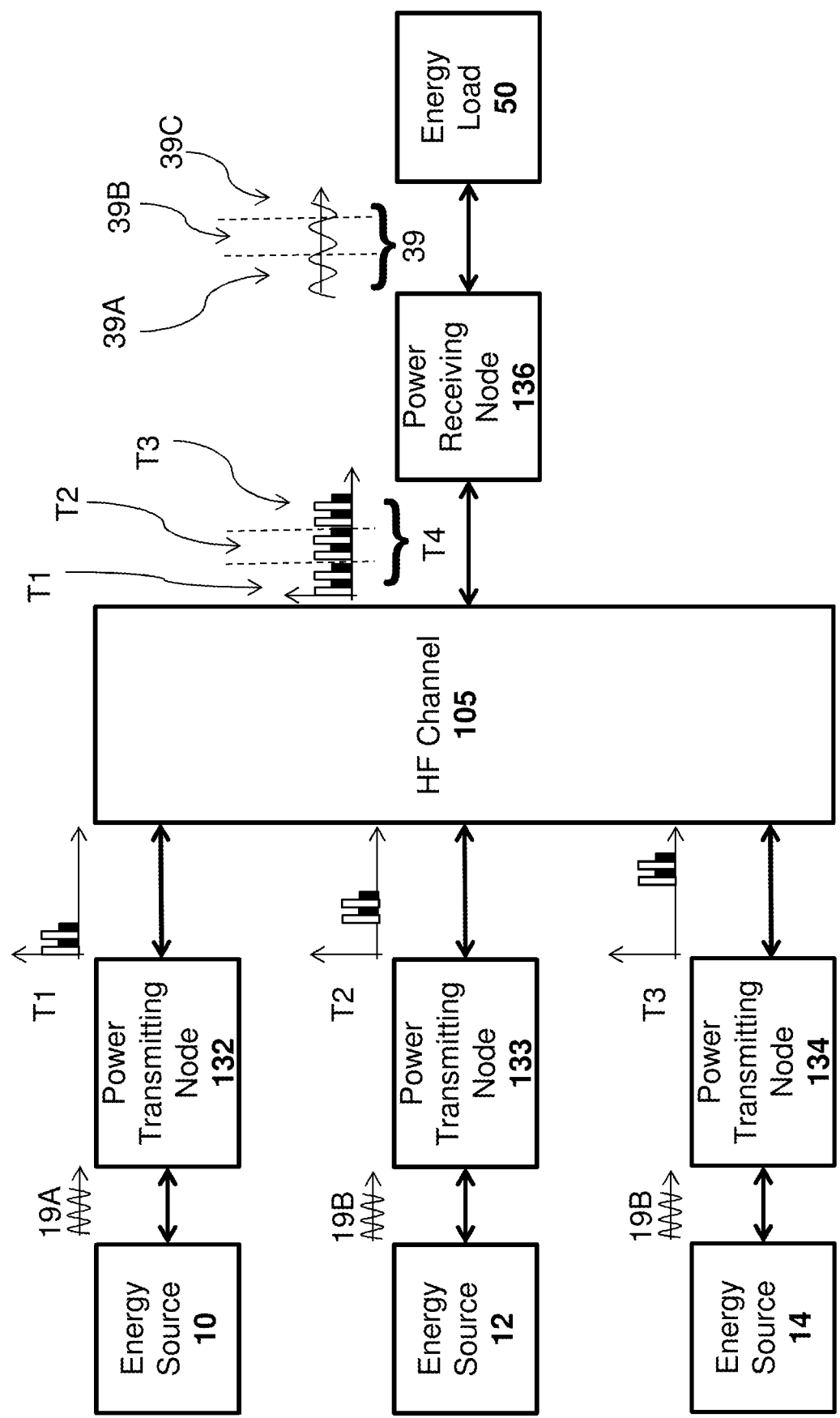
FIG. 7 depicts a diagram of an embodiment of a multi-source power packet transmission system.

It should also be appreciated that the techniques described with respect to FIG. 6 may be implemented in other embodiments featuring two or more power receiving nodes and/or two or more energy loads. It should also be appreciated that in some embodiments an AC power signal is supplied. Further, in some embodiments, the energy source 10 may supply both AC and DC power signals FIG. 7 depicts a diagram of an embodiment of a multi-source power packet transmission system. This embodiment, which corresponds to a MISO system, includes a first energy source 10, a second energy source 12, a third energy source 14, a first power transmitting node 132, a second power transmitting node 133, a third power transmitting node 134, the common HF channel 105, the power receiving node 136, and the energy load 50. The first power transmitting node 132, the second power transmitting node 133, and the third power transmitting node 134 may include the same or similar components and operate in the same or a similar manner as the power transmitting node 132 described in FIG. 4. The power receiving node 136 may include the same or similar components and operate in the same or a similar manner as the power receiving node 136 described in FIG. 4. The common HF channel 105 may operate in the same or similar manner as the common HF channel 105 of FIG. 4. In operation, the system may transform and route power packets from the first power transmitting node 132, the second power transmitting node 133, and/or the third power transmitting node 134 to the power receiving node 136.

In one embodiment, as depicted in FIG. 7, the system may transform a continuous AC power signal 19A into a discrete power packet T1 and route the discrete power packet T1 from the first power transmitting node 132 to the power receiving node 136; transform a continuous AC power signal 19B into a discrete power packet T2 and route the discrete power packet T2 from the second power transmitting node 134 to the power receiving node 136; and/or transform a continuous AC power signal 19C into a discrete power packet T3 and route the discrete power packet T3 from the third power transmitting node 134 to the power receiving node 136. Consequently, the energy load 50 receives continuous AC power signals 39A, 39B, and 39C. In some embodiments, the power receiving node 136 may receive discrete power packets T1, T2, and T3 as a single discrete power packet T4. In some embodiments, the energy load 50 may receive a single continuous AC power signal comprising continuous AC power signal segments 39A, 39B, and/or 39C which may correspond to the continuous AC power signals 19A, 19B, and/or 19C. The discrete power packets T1, T2, and T3 may be transmitted over the common HF channel 105 simultaneously or sequentially. In embodiments in which the discrete power packets T1, T2, and T3 are transmitted sequentially, the order in which the discrete packets are transmitted and/or received may be of significance. Whereas in other embodiments, the discrete packets may be transmitted and/or received in no particular order.

It should also be appreciated that the techniques described with respect to FIG. 7 may be implemented in other embodiments featuring two or more power transmitting nodes and/or two or more energy sources. It should also be appreciated that in some embodiments a DC power signal is supplied. Further, in some embodiments, the first energy source 10 may supply an AC or DC power signal, the second energy source 12 may supply an AC or DC power signal, and the third energy source 14 may supply an AC or DC power signals. The energy load 50 may receive an AC or DC signal. Additionally, the different energy sources may supply different types of power signals for a single transmission. For example, the first energy source 10 may supply an AC power signal 19A, while the second energy source 12 supplies a DC power signal 19B.

Figure 8:
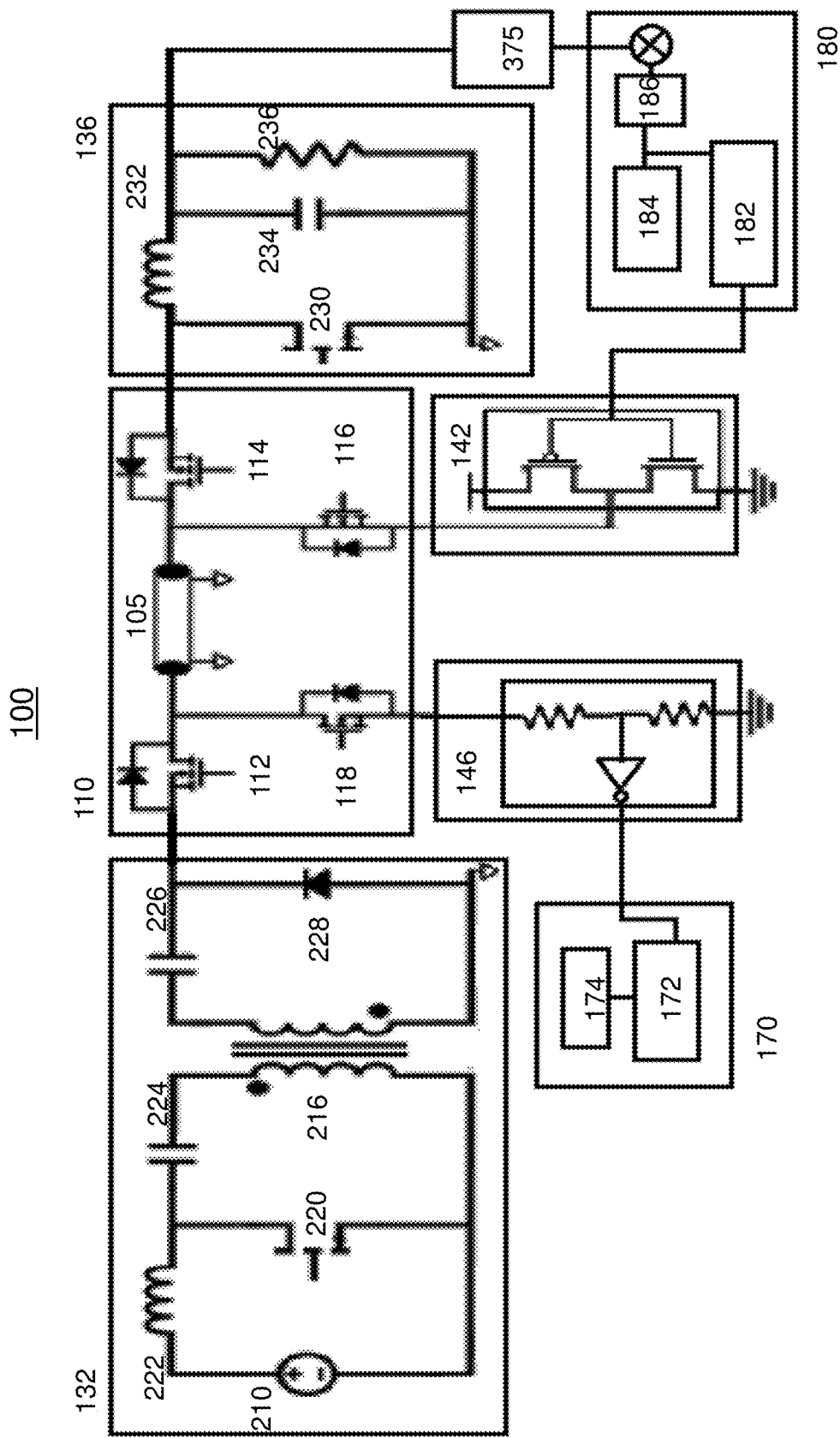
FIG. 8 depicts a detailed schematic diagram of an embodiment of system for co-transmission of power and data signals over a common high frequency channel.

FIG. 8 depicts a detailed schematic diagram of the system 100 for co-transmission of power and data signals over a common high frequency channel. The system 100 includes the switching module 110, the power transmitting node 132, the power receiving node 136, the data transmitting node 142, the data receiving node 146, a first control unit 170, and a second control unit 180. It should be appreciated that the switching module 110, the power transmitting node 132, the power receiving node 136, the data transmitting node 142, and the data receiving node 146 may include the same or similar components as described with respect to FIG. 4 and operate in the same or a similar manner as described with respect to FIG. 4.

The power transmitting node 132 may include a voltage source 210, a primary power switch 220, an input inductor 222, a first blocking capacitor 224, a second blocking capacitor 226, a diode 228, and a transformer 216. The switching action of the primary power switch 220 may be configured to help generate high frequency power signals based on load requirement. The power transmitting node 132 may transmit AC or DC power over the common high frequency channel 105 to the power receiving node 136. The voltage source 210 may be a high or low voltage source. The transformer 216 may convert AC power, provided by a source, to DC power received by the load. The transformer 216 may be configured to convert DC power, provided by a source, to AC power received by the load. In some embodiments, the first blocking capacitor 224 and/or the second blocking capacitor 226 may be film capacitors with self-healing abilities. The first blocking capacitor 224 and/or the second blocking capacitor 226 may have fast energy capture and release capabilities. In some embodiments, a high frequency ceramic capacitor may be added to the power transmitting node 132, across the first blocking capacitor 224 and the second blocking capacitor 226, to ensure a low impedance capacitive path is available to the components that generate noise in the circuit, thereby limiting parasitic inductance. The primary power node 220 may switch on/off synchronously with the power transmitting switch 112 and the power receiving switch 114. In some embodiments, the primary power node 220 may turn/switch off to a deactivated state prior to the power transmitting switch 112 and the power receiving switch 114 turning/switching off to a deactivated state.

The power receiving node 136 may include an output load 236, a secondary switch 230, an output inductor 232, and an output capacitor 234. The power receiving node 136 may receive AC or DC power over the common high frequency node 105 from the power transmitting node 132. The secondary power node 230 may operate synchronously with the data transmitting switch 116 and the data receiving switch 118. The output load 236 may be a high or low voltage. The output load 236, or a value corresponding to the output load 236, of the power receiving node 136 may be fed to a sensor 375. The sensor 375 may be contained within the power receiving node 136 or otherwise coupled to the power receiving node 136.

The power transmitting node 132 and/or the power receiving node 136 may be GaN-based. It should be appreciated that in designing a GaN-based system, special attention should be paid to keeping parasitic inductance in a driver loop to a minimum. Optimizing the physical layout of the components of the system 100 on a printed circuit board (PCB) may limit the parasitic inductance in a high frequency circuit. For example, minimizing the distance between a gate driver output terminal and a gate terminal helps reduce parasitic inductance in a driver loop, thereby producing better high frequency performance of the system 100.

Further, because the performance of a GaN-based system degrades at increasing temperatures, careful consideration should be paid to the thermal management of the system 100. In some embodiments, the power transmitting node 132 and power receiving node 136 may utilize bottom side cooling techniques with an attached heat sink in order to effectively facilitate heat dissipation. In such embodiments, heat generated inside the GaN-based device is directed towards a thermal pad of the device, and the heat is then transferred to the PCB. A combination of internal copper layers and thermal vias are used to internally dissipate and transfer the remaining heat from the PCB to the heat sink. In such an embodiment, the heat sink may be connected to the bottom layer of the PCB. In some embodiments, each layer of the PCB may include a thickness of least 2 oz. of copper.

The data transmitting node 142 includes hardware components to implement the data transfer protocol in furtherance of handling and transmitting data. In some embodiments, the data transmitting node 142 may be configured to switch between transmitting and receiving functionality in order to prevent overlap between power and data networks and/or signals. In such embodiments, the data transmitting node 142 may include a mechanism such as a transient current suppressors (TCS), a transient voltage suppressors (TVS), and/or a single-pole double-through switch to facilitate switching between the transmitting and receiving functionality. The data transmitting node 142 may include a data-transmitter circuit. The data transmitting node 142 may implement an inverting gate-driver integrated circuit (IC), which receives data from the second control unit 180, to transmit low voltage, high frequency data signals over the common HF channel 105. The inverting gate-driver IC may be configured to receive data directly from a serial-communication interface (SCI) module, thereby eliminating the need for any data-amplifier circuitry as is typically used in conventional data transmission over power lines.

The data receiving node 146 includes hardware components configured to receive and handle data transmitted over the common HF channel 105. The data receiver node 146 may include a resistive data-receiver circuit, a digital-isolator interface, and a logic inverter.

The first control unit 170 decodes data signals/packets to retrieve data information and implement a control approach for the system. The first control unit 170 may include a SCI module 172 and a pulse-width modulator (PWM) 174. The first control unit 170 may be configured to receive data from the data receiving node 146, decode the received data using the SCI module 172 and, based on the decoded data, provide gating signals, via the PWM 174, to the primary power switch 220, the power transmitting switch 112, and the data receiving switch 118. The first control unit 170 may be communicatively coupled to the switching module 110, the power transmitting node 132, the data receiving node 146, and the second control unit 180. The first control unit 170 may be a digital signal processor. It should be appreciated that in some embodiments the first control unit 170 is contained within the data receiving node 146 or the power transmitting node 132.

The SCI module 172 may aid in asynchronous data transfer, for example, by comparing precursor signature bits and parity check bits, of a received data packet, to stored signature bits in order to determine whether a data frame/packet has been successfully transmitted and/or whether the corresponding duty cycle of the system 100 should be updated.

The second control unit 180 encodes data information for transmission and aids in implementing a control approach for the system. The second control unit 180 may include a SCI module 182, a PWM 184, and a proportional-integral (PI) compensator 186. The second control unit 180 may receive the output load 236, or a value corresponding to the output load 236, from the sensor 375, compare the output load 236 to a stored reference voltage, generate an error, or error value, corresponding to said comparison, and feed the error to the PI compensator 186. The PI compensator 186 generates a duty cycle based on the received error value and transmits the generated duty cycle to the SCI module 182. The SCI module 182 encodes the generated duty cycle, received from the PI compensator 186, and sends the encoded data to the data transmitting node 142 to transmit over the common HF frequency channel 105. The SCI module 182 may add signature bits and parity check bits to the data information being encoded for transmission. Encoding data with signature bits and/or parity bits helps minimize data corruption while facilitating a more robust and reliable transfer of data. It should be appreciated that the number of bits in a data transmission may vary according to the implemented/selected SCI protocols. Accordingly, different protocols may be implemented to increase the number of data information bits available for transmission. The PWM 184 provides gating signals to the secondary power switch 230, the power receiving switch 114, and the data transmitting switch 116. The second control unit 180 may implement a simple PI-based, closed-loop controller with output voltage feedback in which a generated duty cycle is exchanged between the data transmitting node 142 and the data receiving node 146 using a data protocol (e.g., a modified SCI protocol). The second control unit 180 is communicatively coupled to the switching module 110, the power receiving node 136, the data transmitting node 142, and the first control unit 170. The second control unit 180 may be a digital signal processor. It should be appreciated that in some embodiments the second control unit 180 is contained within the data transmitting node 142 or the power receiving node 136.

Unlike simultaneous co-transmission techniques, time durations for transmitting data using sequential co-transmission are affected by the amount of power transmitted between the load and the source and the duration of the power transmission. Accordingly, conventional data transmission protocols, which require large data overheads, are not necessary for sequential co-transmission. Conversely, data transmission protocols for sequential transmission may entail low data packet size including a small amount of data overhead and dedicated bits. In some embodiments, the data protocol may include one or more bits configured to operate as a mechanism for ensuring data transfer correctness/data packet integrity in order to guard against and/or prevent corruption of data signals caused by noise of the common HF channel 105. Sequential transmission data protocols may incorporate asynchronous SCI protocol. For example, the sequential transmission data protocol may operate in a non-return-to-zero (NRZ) format with a total of 11 bits in a single data frame; wherein one bit is a start bit, one to eight bits are information data bits, one bit is an even/odd parity bit, and one bit is a stop bit. Whereas, in another example, the data protocol frame format may include one start bit, two signature bits, six information data bits, one parity bit, and one stop bit. The odd/even parity bit checks the accuracy of the received data, and may rely on the value of the total sum of the data information bits. However, in some embodiments, the two signature bits are included as an additional measure of protection against data corruption. Additionally, the sequential transmission data transfer protocol may follow an asynchronous communication scheme wherein the clock for the data transmitting node 142 and/or the data receiving node 146 are generated locally. For example, a local clock of the data receiving node 146 may oversample the received data and decide the value(s) of the data information bit(s) based on a majority value of the sampled data bit(s) in each sampling period.

The system 100 may also include a clock component configured to monitor one or more duty cycles, a switching cycle, and/or a duration for which the switches of the system 100 are turned on/off. The clock component may implement the duty cycle generated by the second control unit 180. The clock component may be a centralized clock that enables each component of the system 100 to operate synchronously. In some embodiments, the system 100 may not include the clock component, and instead each of the power transmitting node 132, the power receiving node 136, the data transmitting node 142, and the data receiving node 146 may include and maintain its own local nodal clock. In such embodiments, the system 100 may include a global clock synchronization mechanism to maintain a common time among the power transmitting node 132, the power receiving node 136, the data transmitting node 142, and the data receiving node 146, in order to prevent losses in synchronization, power, and data packets. In some embodiments, the system 100 may implement a self-clocking data modulation technique, in which clock/timing information is embedded within a transmitted data signal/packet and then used to synchronize local nodal clocks. Examples of such self-clocking data modulation techniques include, but are not limited to, Manchester code, eight to fourteen modulation, 4656 modulation, 8b/10b encoding, high level data link control (HDCL), and modified frequency modulation. In other embodiments not utilizing a single, centralized clock component, clock synchronization may be achieved by adding one or more clock synchronization bits to a transmitted data packet frame. In such an embodiment, the one or more clock synchronization bits may contain a predefined bit pattern which may be used by the data receiving node 146 to synchronize its local clock with the local clock of the data transmitting node 142.

In one embodiment of operation, when the primary power switch 220, within the power transmitting node 132, turns/switches on to an active state, and electrical current begins to build up in the input inductor 222. The power transmitting switch 112 and the power receiving switch 114, of the switching module 110, also turn/switch on to an active state as a result of the primary power switch 220 turning/switching on. Switching on the power transmitting switch 112 and the power receiving switch 114 creates a path for the load current, supported by the first blocking capacitor 224 and the second blocking capacitor 226, to flow through the common HF channel 105, thereby enabling the power transmission network 130 to exchange a power signal between the power transmitting node 132 and the power receiving node 136. While the power transmitting switch 112 and the power receiving switch 114 are turned on, the data transmitting switch 116 and the data receiving switch 118 are turned off to prevent the data transmission network 140 from using the common HF channel 105 to exchange data signals. The primary power switch 220, the power transmitting switch 112, and the power receiving switch 114 may be turned on for a duration as dictated by a duty cycle, d. It should be appreciated that although operation of the power transmitting switch 112 and the power receiving switch 114 may be synchronized to the primary power switch 220, an additional duty cycle, δ, may be added to the duty cycle, d, of the power transmitting switch 112 and/or the power receiving switch 114 to enable leakage current, generated by the transformer 216, to flow from the power transmitting node 132 through the power transmitting switch 112 and/or the power receiving switch 114 to the power receiving node 136, even after the primary power switch 220 is turned off. The value/duration/length of the additional duty cycle, δ, may depend on the amount of leakage energy stored in the transformer 216. In turn, the amount of leakage stored in the transformer 216 may correspond to the amount of power required by the power receiving node 136.

After the primary power switch 220 is turned off, energy stored in the input inductor 222 is applied to charge the first blocking capacitor 224 and the second blocking capacitor 226, and the load (i.e., power receiving node 136) is fed from energy stored in the output inductor 232. The power transmitting switch 112 is switched off, thereby disconnecting the power transmitting node 132 from the common HF channel 105, and the power receiving switch 114 is switched off, thereby disconnecting the power receiving node 136 from the common HF channel 105. Accordingly, the power transmission network 130 is disconnected from the common HF channel 105.

The secondary switch 230, of the power receiving node 136, turns/switches on after the primary power switch 220 turns/switches off. After the power transmitting switch 112 and/or the power receiving switch 114 are disconnected from the common HF channel 105 and the secondary switch 230 is turned on, the data transmitting switch 116 and the data receiving switch 118 may be switched on. Accordingly, the data transmission network 140 connects to the common HF channel 105 to create an isolated channel for data exchange between the data transmitting node 142 and the data receiving node 146. The data transmitting switch 116 and the data receiving switch 118 may be turned on for the remaining time of the switching cycle. After a switching cycle is complete and the data switches turn/switch off to a deactivated state, the power switches may turn on again to an activated state, and a new switching cycle may commence. The duration of new switching cycle may be for the same or a different duration as the previous switching cycle.

At the onset of each switching cycle, the sensor 375 senses the output load 236 of the power receiving node 136. Using this output load sensed by the sensor 375, an error may be generated by comparing the value of the output load 236 with a predefined reference value. This error is then fed to the PI compensator 186, of the second control unit 180, and a closed-loop duty cycle is generated. The SCI Module 182 then converts the generated duty cycle to an 8-bit data format including one or more precursor signature bits. During the data transfer interval of the sequential transmission, the data transmitting node 142 transmits this data packet, containing the generated duty cycle, over the common HF channel 105 from to the data receiving node 146. Once the data receiving node 146 receives the data, the packet is fed to the first control unit 170. The SCI module 172, of the first signal control unit 170, compares the one or more precursor signature bits with one or more stored signature bits. If the first control unit 170 determines that the precursor signature bits of the data packet match the stored signature bits, then the first control unit 170 transmits an acknowledgement to the second control unit 180, and the generated duty cycle is updated and implemented in the system 100 for the next switching cycle. However, if the first control unit 170 determines that the precursor signature bits of the data packet do not match the stored signature bits, then the first control unit 170 does not send an acknowledgement to the second control unit 180 because the received data packet is corrupted. Accordingly, the system 100 does not update and implement the duty cycle generated by the second control unit 180. Instead, the system 100 continues to operate using the previous duty cycle (i.e., the duty cycle equal to the last successfully transmitted duty cycle). The system 100 may continue to operate in a quasi-closed loop, and ultimately achieve a quasi-steady state with a delayed duty cycle until satisfactory communication between the data transmitting node 142 and the data receiving node 146 is reestablished.

Figure 9:
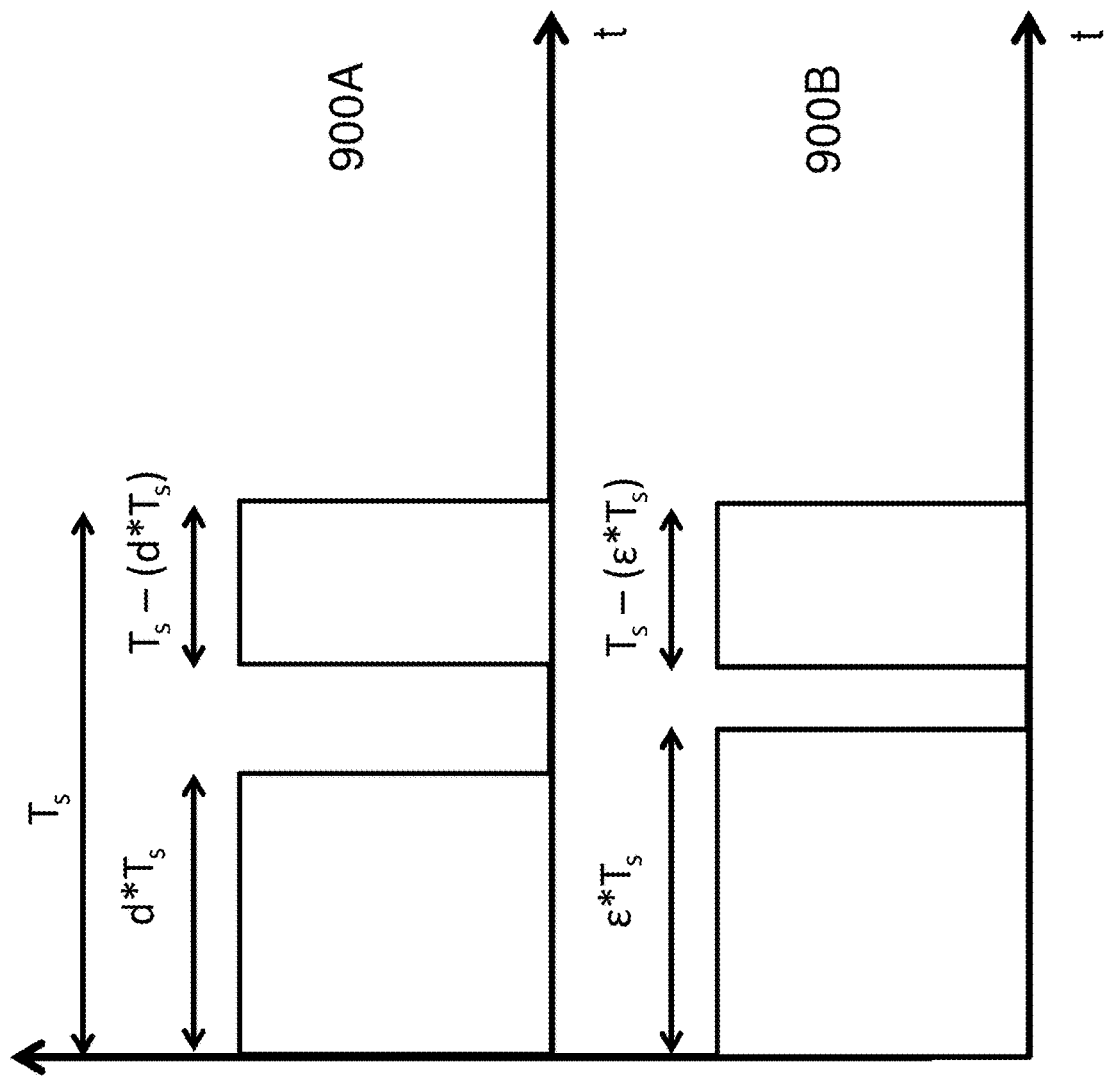
FIG. 9 depicts a timing diagram for switches that enable a co-transmission of power and data signals over a common high frequency channel.

FIG. 9 depicts timing diagrams for switches that enable a co-transmission of power and data signals over a common high frequency channel. Timing diagram 900A depicts a duty cycle for the power transmitting node 132 and the power receiving node 136. Timing diagram 900B depicts a duty cycle of the switching module 110. $T_s$ corresponds to a total interval for a single power and data transmission. $[d*T_s]$ corresponds to a timing signal for the primary power switch (e.g., the primary power switch 220 of FIG. 8). $[T_s-(d*T_s)]$ corresponds to a timing signal for the secondary power switch (e.g., the secondary power switch 230 of FIG. 8). $[\varepsilon*T_s]$ corresponds to an interval of time over which power is transmitted over the common HF frequency channel. Accordingly, $[\varepsilon*T_s]$ represents the timing signal for a power transmitting switch (e.g., the power transmitting switch 112 of FIGS. 4 and 8) and a power receiving switch (e.g., the power receiving switch 114 of FIGS. 4 and 8). $[T_s-(\varepsilon*T_s)]$ corresponds to an interval of time over which data is transmitted over the common HF frequency channel. Accordingly, $[T-(\varepsilon*T_s)]$ represents the timing signal for a data transmitting switch (e.g., the data transmitting switch 116 of FIGS. 4 and 8) and a data receiving switch (e.g., the data receiving switch 118 of FIGS. 4 and 8). It should be appreciated that all switches in the switching module 110, the power transmission network 130, and the data transmission network 140 may be synchronized to a common clock (e.g., via a clock component). The value of $\varepsilon$ is equal to the duty cycle, d, of the power transmitting node 132 and the power receiving node 136 plus the duration of any additional duty cycle (i.e., $\varepsilon=d+\delta$). The total conduction time for the primary power switch is equal to $d*T_s$, and thus an interval for the secondary power switch may be $[T_s-(d*T_s)]$. In some embodiments, the system may be configured to operate as an open-loop system. Whereas in other embodiments, the system may be configured to operate using a closed-loop duty cycle.

The durations for power and data signal transmissions may depend on the value of d. For example, in embodiments in which the power receiving node 136 requires a low output voltage, a low value of d is needed, and thus the power transmitting node 132 transmits the low voltage power signal to the power receiving node 136 over short(er) period of time. Consequently, more time is available in the switching cycle for transmitting data, and the time duration for data transmission from the data transmitting node 142 to the data receiving node 146 is increased. Conversely, in embodiments in which the power receiving node 136 requires a high output voltage, a high value of d is needed, and thus the power transmitting node 132 transmits the high voltage to the power receiving node 136 over a long(er) period of time. Consequently, less time is available in the switching cycle for transmitting data, and the time duration for data transmission from the data transmitting node 142 to the data receiving node 146 is decreased. However, when d is high (i.e., a high output voltage is required), communication speed of data may be increased to enhance data baud rate and to compensate for the reduction in available transmission time.

Figure 10:
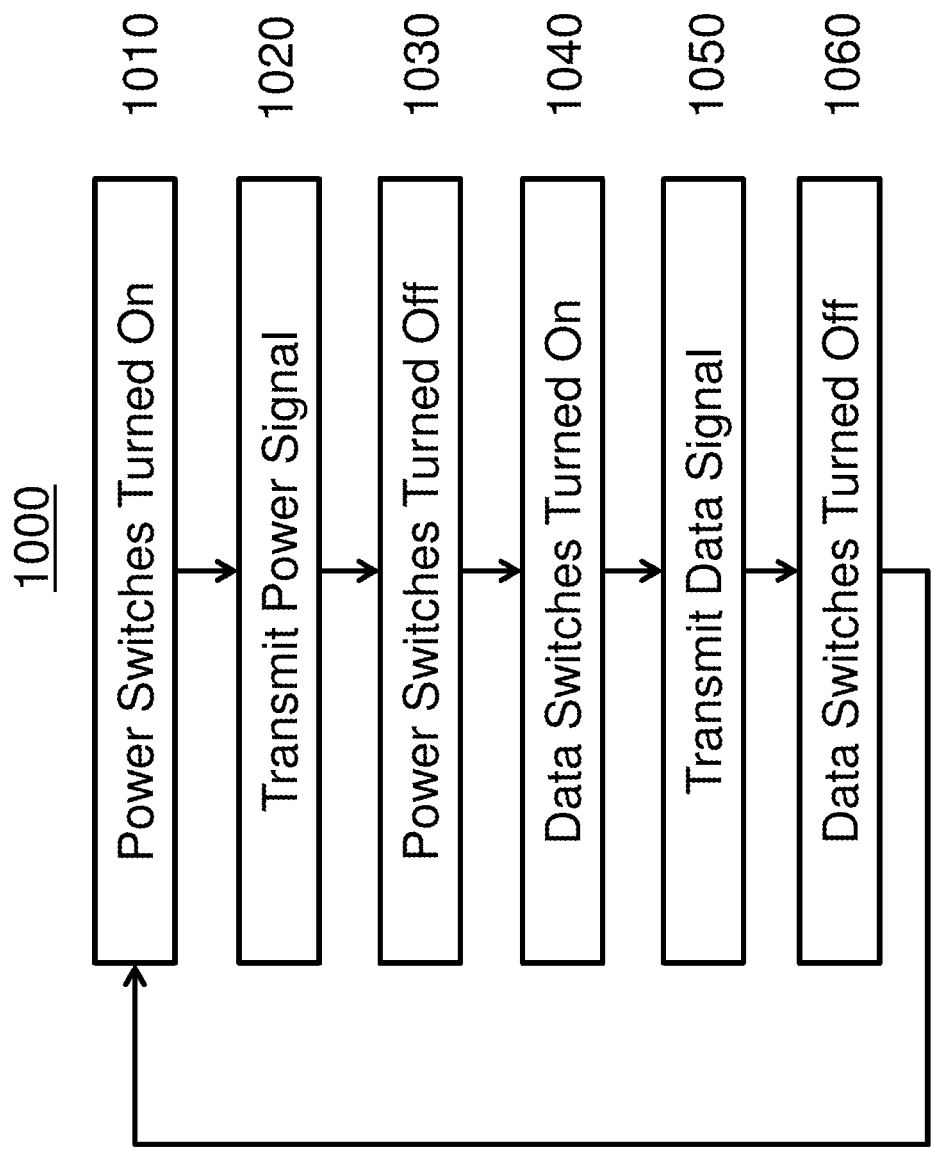
FIG. 10 depicts a method for sequentially transmitting power and data over a common high frequency channel.

FIG. 10 depicts a method for sequentially transmitting power and data over a common high-frequency channel. The method 1000 may be implemented as described above in connection with FIGS. 4 and 3. Accordingly, the method 1000 may be partially or completely implemented by the system 100.

In the method 1000, a primary power switch (e.g., the primary power switch of FIG. 8) of a power transmitting node (e.g., the power transmitting node 132 of FIGS. 4 and 3), and a power transmitting switch (e.g., the power transmitting switch 112 of FIGS. 4 and 3) and a power receiving switch (e.g., the power receiving switch 114 of FIGS. 4 and 3) of a switching module (e.g., the switching module 110 of FIGS. 4 and 3) are all switched/turned on to an activate state in furtherance of transmitting electrical power from the power transmitting node to the power receiving node (block 1010). The power transmitting node contains or is connected to a source (e.g., the voltage source 210 of FIG. 8), and the power receiving node contains or is connected to a load requiring electrical power (e.g., the output load 236 of FIG. 8). While the primary power switch, the power transmitting switch, and the power receiving switch are in an activated state, a secondary power switch (e.g., the secondary power switch 230 of FIG. 8), and a data transmitting switch (e.g., the data transmitting switch 116 of FIGS. 4 and 3), and a data receiving switch (e.g., the data receiving switch 118 of FIGS. 4 and 3) of the switching module may be in a deactivated/turned off state so that data signals cannot be transmitted over the common high frequency channel. The power transmitting switch connects the power transmitting node to the common high frequency channel, and the power receiving switch connects the power receiving node to the common high frequency channel. When each of the primary power switch, the power transmitting switch, and the power receiving switch are in an activated state, the method 1000 proceeds to block 1020.

The power transmitting node transmits a power signal over a common high frequency channel to the power receiving node (block 1020). Power is transmitted over the common high frequency node (e.g., the common HF channel 105 of FIGS. 4 and 3) while the primary power switch, the power transmitting switch, and the power receiving switch are in an activated state.

After the power transmitting node transmits the power signal over the common high frequency channel to the power receiving node, the primary power switch, the power transmitting switch, and the power receiving switch are turned off to a deactivated state (block 1030). In some embodiments, the primary power switch, the power transmitting switch, and/or the power receiving switch may turn off after a duration of a predefined duty cycle reaches completion. In some embodiments, the primary power switch, the power transmitting switch, and/or the power receiving switch may turn off after the power receiving node, or a load connected to the power receiving node, receives the requisite amount of power. The primary power switch, the power transmitting switch, and/or the power receiving switch may turn/switch off after the power transmitting node, or a voltage/power source connected to the power transmitting node, transmits all available power over the common high frequency channel. The primary power switch, the power transmitting switch, and/or the power receiving switch may synchronously turn off to a deactivated state. In some embodiments, the primary power switch, the power transmitting switch, and/or the power receiving switch may asynchronously turn off to a deactivate state. The method proceeds to block 1040 after each of the primary power switch, the power transmitting switch, and the power receiving switch are turned off to a deactivated state.

The secondary power switch, the data transmitting switch, and the data receiving switch turn on to an activated state after the primary power switch, the power transmitting switch, and the power receiving switch are turned off to a deactivated state. The data transmitting switch connects a data transmitting node to the common high frequency channel, and the data receiving switch connects a data receiving node to the common high frequency channel. When the secondary power switch, the data transmitting switch, and the data receiving switch are in an activated state, the method 1000 proceeds to block 1050.

The data transmitting node transmits data packets over the common high frequency channel to the data receiving node (block 1050). The data packets transmitted over the common high frequency channel may contain information pertaining to maintaining or updating a duty cycle of the system. The data packets may be transmitted using a specialized data transmission protocol, such as those discussed below with respect to the method 1100.

Next, the secondary power switch, the data transmitting switch and the data receiving switch are turned off to a deactivated state (block 1060). The secondary power switch, the data transmitting switch, and the data receiving switch turn off to a deactivated state after the data receiving node receives and/or decodes the data packet. In some embodiments, the secondary power switch, the data transmitting switch, and/or the data receiving switch may be turned off after the duration of a switching cycle reaches completion. In some embodiments, the secondary power switch, the data transmitting switch, and/or the data receiving switch may be turned off after the duration of a predefined duty cycle reaches completion. The secondary power switch, the data transmitting switch, and/or the data receiving switch may synchronously turn off to a deactivated state. In some embodiments, the secondary power switch, the data transmitting switch, and/or the data receiving switch may asynchronously turn off to a deactivate state. After the secondary power switch, the data transmitting switch, and the data receiving switch switch/turn off to a deactivated state, the method 1000 may return to block 1010 and repeat.

It should be appreciated that in some embodiments of the method 1000, blocks 1010 to 1030 and/or blocks 1040 to 1060 may not be executed sequentially, such that blocks 1010 to 1030 may be repeated multiple times before blocks 1040 to 1060 are carried out (i.e., the common high frequency channel is utilized to sequentially transmit a plurality of power signals before being used to transmit a data signal). Similarly, in some embodiments, blocks 1040 to 1060 may be repeated multiple times before blocks 1010 to 1030 are carried out (i.e., the common high frequency channel is utilized to sequentially transmit a plurality of data signals before being used to transmit a power signal).

Figure 11:
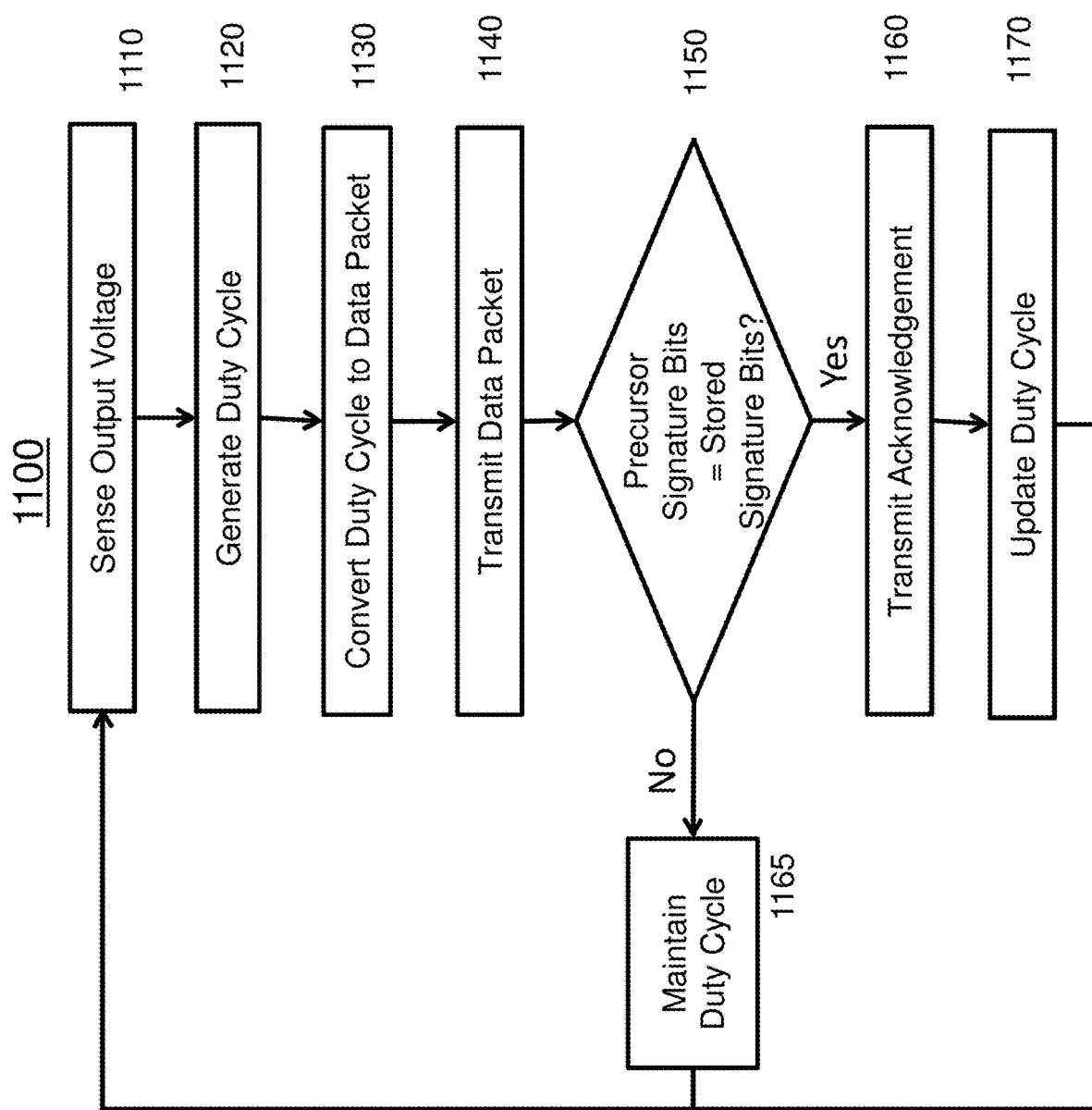
FIG. 11 depicts a method for implementing a closed-loop control approach for managing a sequential co-transmission of power and data over a transmission link.

FIG. 11 depicts a method for implementing a closed-loop control approach for managing a sequential co-transmission of power and data over a transmission link. The method 1100 may be implemented as described above in connection with FIG. 4-4. Accordingly, the method 1100 may be partially or completely implemented by the system 100.

In the method 1100, an output voltage of a power receiving node is sensed at the onset of each switching cycle (block 1110). The power receiving node (e.g., the power receiving node 136 of FIGS. 4 and 3) may receive power transmitted over a common high frequency channel (e.g., the common HF channel 105 of FIGS. 4 and 3) from a power transmitting node (e.g., the power transmitting node 132 of FIGS. 4 and 3), as discussed above with reference to block 1020 of the method 1000. The sensed output voltage of the power receiving node may correspond to the amount of power received from the power transmitting node. The output voltage may be sensed by a senor (e.g., the sensor 375 of FIG. 8) and fed to a second control unit (e.g., the second control unit 180 of FIG. 8). The second control unit, or component thereof, may compare the output voltage, or a value corresponding to the received output voltage, with a predefined reference voltage, or predefined value corresponding to a reference voltage, stored at/in the second control unit, or a component thereof. The second control unit, or component thereof, may then generate an error, corresponding to the comparison of the output voltage with the predefined reference voltage, and transmit this generated error to a PI compensator. Once the generated error is fed to the PI compensator the method 1100 proceeds to block 1120.

The PI compensator generates a closed-loop duty cycle based on the received error (block 1120). Once the PI compensator generates the duty cycle, the duty cycle may be sent to a serial communication module (e.g., the SCI module 182 of FIG. 8) and the method 1100 proceeds to block 1130.

The SCI module converts the received duty cycle into a data format (block 1130). The SCI module receives the generated duty cycle from the PI compensator and converts the duty cycle into a data format in preparation for transmitting the generated duty cycle as part of a data packet to a data receiving node. In some embodiments, for example, the generated duty cycle may be converted into an 8-bit data format comprising 2 precursor signature bits and 6 data information bits. After the SCI module converts the generated duty cycle into a data format, the method 1100 proceeds to block 1140.

During the next data transfer interval, the data packet including the generated duty cycle data is transmitted (block 1140). The data packet is transmitted over a common HF frequency channel (e.g., the common HF frequency channel 105 of FIGS. 4 and 3) from a data receiver node (e.g., the data receiver node 146 of FIGS. 4 and 3) to a data transmitter node (e.g., the data transmitter node 142 of FIGS. 4 and 3). The data transfer interval is an interval of the system in which a secondary power switch (e.g., the secondary power switch 230 of FIG. 8), a data transmitting switch (e.g., the data transmitting switch 116 of FIGS. 4 and 3) and a data receiving switch (e.g., the data receiving switch 118 of FIGS. 4 and 3) are turned on and in an activated state, such as described, for example, during block 1050 of the method 1000.

After the data receiving node receives the data packet, a first control unit compares the precursor signature bits of the data packet with stored signature bits (block 1150). The first control unit may be configured to compare the precursor signature bits of the data packet when the packet reaches an SCI module (e.g., the SCI module 172 of FIG. 8) of the first control unit. The SCI module then decodes the received data packet and compares the precursor signature bits, or data represented by the precursor signature bits, of the received data packet with stored signature bits, or data represented by the stored signature bits, stored at/in the first control unit, or a component thereof. When the SCI module determines that the precursor signature bits of the received data packet match/are equal to the stored signature bits, the method 1100 proceeds to block 1160. When the SCI module determines that the precursor signature bits of the received data packet do not match/are not equal to the stored signature bits, the method 1100 proceeds to block 1165.

When the precursor signature bits of the received data packet match the stored signature bits, the first control unit transmits an acknowledgment to the second control unit (block 1160). Accordingly, the duty cycle for the power nodes (e.g., the primary power switch, the secondary power switch 230, the power transmitting switch 112, and the power receiving switch 114 of FIGS. 4 and 3) are updated to implement the generated duty cycle, embedded in the data packet, during the next switching cycle. A first PWM (e.g., the PWM 174 of FIG. 8), of the first control unit, then transmits a first updated gating signal to the primary power switch, the power transmitting switch, and the data receiving switch, and a second PWM (e.g., the PWM 184 of FIG. 8), transmits a second updated gating signal to the secondary power switch, the power receiving switch, and the data transmitting switch. The method 1100 may return to block 1110 and repeat based on the updated duty cycle.

When the first control unit determines that the precursor signature bits of the received data packet do not match, no acknowledgement is transmitted to the second control unit and the duty cycle for each power node remains unchanged (block 1165). The duty cycle for each power node (e.g., the primary power switch 220, the secondary power switch 230, the power transmitting switch 112, and the power receiving switch 114 of FIGS. 4 and 3) may remain equal to the last successfully transmitted duty cycle. Accordingly, the method 1100 may return to block 1110 and repeat while operating in a quasi-steady state.

It should be appreciated that in some embodiments, the method 1000 and the method 1100 may be executed in conjunction with one another. For example, the method 1100 may provide the duty cycle for which the method 1000 operates.

It should be appreciated that the term "switched on," "turned on," "activated state," or similar terminology refers to a switching component being active/on so as to be operational. Whereas the term "switched off," "turned off," "deactivated state," or other similar terminology refers to a switching component being off so as to be non-operational.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more systems (e.g., a standalone, computer system) or one or more hardware modules of a system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed:

1. A system for co-transmission of power and data comprising:
    a power transmitting node, wherein the power transmitting node (i) includes a primary power switch, (ii) transforms an incoming power signal to one or more discrete, coded power packets, and (iii) transmits the one or more discrete, coded power packets;
    a power receiving node, wherein the power receiving node (i) includes a secondary power switch, (ii) receives the one or more discrete, coded power packets, (iii) transforms the one or more discrete, coded power packets to an output power signal, and (iv) provides the output power signal to a load;
    first and second data nodes, each of the first and second data nodes operable both to send and receive data, and at any one time each of the first and second data nodes being either a data transmitting node or a data receiving node;
    a switching module comprising:
        a common high frequency channel configured to convey the one or more discrete, coded power packets and one or more data packets;
        a power transmitting switch physically coupling the power transmitting node to the common high frequency channel when switched on and physically isolating the power transmitting node from the common high frequency channel when switched off;
        a power receiving switch physically coupling the power receiving node to the common high frequency channel when switched on and physically isolating the power receiving node from the common high frequency channel when switched off;
        a data transmitting switch physically coupling the data transmitting node to the common high frequency channel when switched on and physically isolating the data transmitting node from the common high frequency channel when switched off;
        a data receiving switch physically coupling the data receiving node to the common high frequency channel when switched on and physically isolating the data receiving node from the common high frequency channel when switched off;
    a first control unit configured to provide a first gating signal to the primary power switch, the power transmitting switch, and the power receiving switch; and
    a second control unit configured to provide a second gating signal to the secondary power switch, the power receiving switch, and the data transmitting switch;
    wherein when the primary power switch, the power transmitting switch, and the power receiving switch are turned on, the secondary power switch, the data transmitting switch, and the data receiving switch are turned off, and the one or more power packets are transmitted over the common high frequency channel from the power transmitting node to the power receiving node, and
    when the secondary power switch, the data transmitting switch, and the data receiving switch are turned on, the primary power switch, the power transmitting switch, and the power receiving switch are turned off, and the one or more data packets are transmitted over the common high frequency channel from the data transmitting node to the data receiving node, and
    further wherein:
    the second control unit is further configured to encode a duty cycle in the one or more data packets,
    the first control unit is further configured to analyze the one or more data packets to compare one or more precursor signature bits contained in the one or more data packets with one or more stored signature bits, and
    wherein the first control unit transmits an acknowledgement to the second control unit when the first control unit determines that the one or more precursor signature bits contained in the one or more data packets match the one or more stored signature bits.

2. The system of claim 1, wherein the first control unit further comprises:
    a first serial communication interface (SCI) module configured to decode the one or more data packets; and
    a first pulse-width modulator (PWM) component configured to transmit the first gating signal when the first control unit determines that the one or more precursor signature bits contained in the one or more data packets match the one or more stored signature bits.

3. The system of claim 1, wherein the second control unit further comprises;
    a PI compensator configured to generate the duty cycle based on a received error corresponding to an output voltage of the power receiving node;
    a second serial communication interface (SCI) module configured to convert the generated duty cycle into a format to be transmitted by the data transmitting node as part of the one or more data packets; and
    a second pulse-width modulator (PWM) component configured to transmit the second gating signal when the second control unit receives the acknowledgement from the first control unit.

4. The system of claim 1, wherein the one or more power packets and the one or more data packets are transmitted sequentially or simultaneously over the common high frequency channel.

5. The system of claim 1, wherein when the power receiving node requires a low output voltage, a first duration of time to transmit the one or more power packets is decreased, and a second duration of time to transmit the one or more data packets is increased.

6. The system of claim 1, wherein when the power receiving node requires a high output voltage, a first duration of time to transmit the one or more power packets is increased, and a second duration of time to transmit the one or more data packets is decreased.

7. The system of claim 1, wherein the common high frequency channel is at least one of a waveguided or a free space channel.

8. A method for sequentially transmitting power and data comprising:
- transforming, at a power transmitting node, an incoming power signal to one or more discrete, coded power packets;
- transmitting a power packet, via a common high frequency channel of a switching module, from the power transmitting node to a power receiving node when a primary power switch, a power transmitting switch, and a power receiving switch are in an active state while a secondary power switch, a data transmitting switch, and a data receiving switch are in a non-active state;
- receiving, at the power receiving node, the one or more discrete, coded power packets, transforming the one or more discrete, coded power packets to an output power signal, and providing the output power signal to a load; and
- transmitting a data packet, via the common high frequency channel of the switching module, between first and second data nodes each operable both to send and receive data, from a data transmitting node of the first and second data nodes to a data receiving node of the first and second data nodes, when the secondary power switch, the data transmitting switch, and the data receiving switch are in an active state while the primary power switch, the power transmitting switch, and the power receiving switch are in a non-active state;
- sensing, via a sensor gain, an output voltage value of the power receiving node;
- calculating, via a second control unit, an error value based on the difference between a predefined reference value and the output voltage value;
- generating, via a proportional-integral (PI) compensator, data corresponding to a duty cycle value based on the calculated error value;
- converting, via a second serial communication interface (SCI) module, data corresponding to the generated duty cycle value into a data format to be transmitted as part of the data packet by the data receiving node over the common high frequency channel, wherein the data packet includes one or more precursor signature bits;
- receiving, via the data receiving node, the data packet from the data transmitting node;
- decoding, via a first serial communication (SCI) module of a first control unit, the data packet;
- comparing, via the first control unit, the one or more precursor signature bits of the data packet with one or more stored signature bits;
- determining, via the first control unit, whether the one or more precursor signature bits of the data packet are the same as the one or more stored signature bits;
- transmitting, via the first control unit, an acknowledgement to a second control unit when the one or more precursor signature bits of the data packet are the same as the one or more stored signature bits;
- transmitting, via a first pulse-width module (PWM), a first duty cycle to the primary power switch, wherein the first duty cycle corresponds to a duty cycle for which the primary power switch will be activated; and
- transmitting, via a second pulse-width module (PWM), a second duty cycle to the secondary power switch, wherein the second duty cycle corresponds to a duty cycle for which the secondary power switch will be activated, wherein:
- the power transmitting switch physically couples the power transmitting node to the common high frequency channel;
- the power receiving switch physically couples the power receiving node to the common high frequency channel;
- the data transmitting switch physically couples the data transmitting node to the common high frequency channel;
- the data receiving switch physically couples the data receiving node to the common high frequency channel.

9. The method of claim 8, wherein the first duty cycle and the second duty cycle are implemented at a subsequent switching cycle.

10. The method of claim 8, wherein the power transmitting switch and the power receiving switch are activated for a same first duty cycle as the primary power switch; and
the data transmitting switch and the data receiving switch are activated for a same second duty cycle as the secondary power switch.

11. The method of claim 8, further comprising:
- maintaining, via the first control unit, a first existing duty cycle of the primary power switch when the first control unit determines the one or more precursor signature bits of the data packet are not the same as the one or more stored signature bits; and
- maintaining, via the second control unit, a second existing second duty cycle of the secondary power switch when the second control unit does not receive the acknowledgement from the first control unit.

* * * * *

UNITED STATES PATENT AND TRADEMARK OFFICE
CERTIFICATE OF CORRECTION

PATENT NO. : 11,245,437 B2
APPLICATION NO. : 16/247505
DATED : February 8, 2022
INVENTOR(S) : Sudip K. Mazumder et al.

It is certified that error appears in the above-identified patent and that said Letters Patent is hereby corrected as shown below:

In the Claims

At Column 26, Lines 13-14, "node, and" should be -- node, --.

At Column 27, Lines 22-23, "load; and" should be -- load; --.

At Column 27, Line 50, "(SCI)" should be -- interface (SCI) --.

Signed and Sealed this
Thirty-first Day of May, 2022

Katherine Kelly Vidal
*Director of the United States Patent and Trademark Office*